(12) United States Patent
Chung et al.

(10) Patent No.: US 12,518,151 B2
(45) Date of Patent: Jan. 6, 2026

(54) RESIDUAL QUANTIZATION FOR NEURAL NETWORKS

(71) Applicant: Microsoft Technology Licensing, LLC, Redmond, WA (US)

(72) Inventors: Eric S. Chung, Woodinville, WA (US); Daniel Lo, Bothell, WA (US); Jialiang Zhang, Middleton, WI (US); Ritchie Zhao, Ithaca, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 353 days.

(21) Appl. No.: 18/110,794

(22) Filed: Feb. 16, 2023

(65) Prior Publication Data

US 2023/0196085 A1 Jun. 22, 2023

Related U.S. Application Data

(63) Continuation of application No. 16/221,187, filed on Dec. 14, 2018, now Pat. No. 11,586,883.

(51) Int. Cl.
*G06N 3/06* (2006.01)
*G06F 9/54* (2006.01)
(Continued)

(52) U.S. Cl.
CPC ............ *G06N 3/063* (2013.01); *G06F 9/54* (2013.01); *G06F 17/16* (2013.01)

(58) Field of Classification Search
CPC ........ G06N 3/063; G06N 3/045; G06N 3/084; G06F 9/54
See application file for complete search history.

(56) References Cited

U.S. PATENT DOCUMENTS

| | | | | |
|---|---|---|---|---|
| 2001/0009545 A1* | 7/2001 | Schilling | ............... | H04B 1/7093 370/335 |
| 2001/0037406 A1* | 11/2001 | Philbrick | ............... | H04L 69/161 709/250 |

(Continued)

FOREIGN PATENT DOCUMENTS

| | | |
|---|---|---|
| CN | 104246875 A | 12/2014 |
| CN | 106570559 A | 4/2017 |

(Continued)

OTHER PUBLICATIONS

Office Action Received for Chinese Application No. 201980081880.0, mailed on May 11, 2024, 12 pages.(English Translation Provided).

(Continued)

*Primary Examiner* — Tuan C Dao
(74) *Attorney, Agent, or Firm* — Klarquist Sparkman, LLP

(57) ABSTRACT

Methods and apparatus are disclosed for providing emulation of quantized precision operations in a neural network. In some examples, the quantized precision operations are performed in a block floating-point format where values of a tensor share a common exponent. Techniques for selecting higher precision or lower precision can be used based on a variety of input metrics. When converting to a quantized tensor, a residual tensor is produced. In one embodiment, an error value associated with converting from a normal-precision floating point number to the quantized tensor is used to determine whether to use the residual tensor in a dot product calculation. Using the residual tensor increases the precision of an output from a node. Selection of whether to use the residual tensor can depend on various input metrics including the error value, the layer number, the exponent value, the layer type, etc.

19 Claims, 14 Drawing Sheets

(51) Int. Cl.
  *G06F 17/16* (2006.01)
  *G06N 3/063* (2023.01)

(56) References Cited

U.S. PATENT DOCUMENTS

| | | | | |
|---|---|---|---|---|
| 2002/0077812 | A1* | 6/2002 | Suzuki | G10L 19/16 |
| | | | | 704/E19.035 |
| 2003/0161278 | A1* | 8/2003 | Igura | H04J 13/00 |
| | | | | 370/320 |
| 2005/0149807 | A1* | 7/2005 | Xu | G01R 31/2834 |
| | | | | 714/742 |
| 2006/0173945 | A1* | 8/2006 | Lopez-Estrada | G06F 17/10 |
| | | | | 708/300 |
| 2007/0297374 | A1* | 12/2007 | El-Damhougy | H04W 40/24 |
| | | | | 370/338 |
| 2009/0074177 | A1* | 3/2009 | Takada | H04M 9/082 |
| | | | | 379/406.01 |
| 2009/0292750 | A1* | 11/2009 | Reyzin | G06F 7/483 |
| | | | | 708/209 |
| 2011/0099295 | A1 | 4/2011 | Wegener | |
| 2012/0082225 | A1* | 4/2012 | Chen | H04N 19/119 |
| | | | | 375/240.12 |
| 2012/0147961 | A1* | 6/2012 | Guo | H04N 19/17 |
| | | | | 375/240.16 |
| 2012/0287141 | A1* | 11/2012 | Higgins | H04N 19/98 |
| | | | | 708/203 |
| 2013/0114733 | A1* | 5/2013 | Fukui | G10L 19/038 |
| | | | | 375/240.22 |
| 2013/0163671 | A1* | 6/2013 | Korman | H04N 19/176 |
| | | | | 375/240.16 |
| 2015/0264372 | A1* | 9/2015 | Kolesnikov | H04N 19/52 |
| | | | | 375/240.16 |
| 2015/0381993 | A1* | 12/2015 | Lim | H04N 19/18 |
| | | | | 375/240.18 |
| 2016/0198175 | A1* | 7/2016 | Shima | H04N 19/61 |
| | | | | 375/240.12 |
| 2016/0322059 | A1* | 11/2016 | Vlietinck | G10L 15/144 |
| 2017/0064331 | A1* | 3/2017 | Korman | H04N 19/176 |
| 2017/0140012 | A1* | 5/2017 | Bortnikov | G06V 10/763 |
| 2017/0140273 | A1* | 5/2017 | Sagher | G06N 3/045 |
| 2017/0323197 | A1 | 11/2017 | Gibson et al. | |
| 2018/0004878 | A1* | 1/2018 | Hutton | G06F 30/3312 |
| 2018/0174275 | A1* | 6/2018 | Bourdev | G06V 30/19147 |
| 2018/0232883 | A1* | 8/2018 | Sethi | G16H 30/40 |
| 2019/0171935 | A1* | 6/2019 | Agrawal | G06N 3/04 |
| 2019/0213234 | A1* | 7/2019 | Bayat | G11C 16/0483 |
| 2020/0186528 | A1* | 6/2020 | Fan | G06F 17/16 |
| 2020/0302299 | A1* | 9/2020 | Nagel | G06N 3/063 |
| 2021/0256364 | A1* | 8/2021 | Wang | G06F 9/30134 |
| 2021/0274225 | A1* | 9/2021 | Makeev | H04N 19/176 |
| 2021/0350210 | A1* | 11/2021 | Gong | G06N 3/063 |
| 2022/0036155 | A1* | 2/2022 | Guevara | G06N 3/063 |

FOREIGN PATENT DOCUMENTS

| | | |
|---|---|---|
| CN | 107526709 A | 12/2017 |
| CN | 108805796 A | 11/2018 |

OTHER PUBLICATIONS

Second Office Action Received for Chinese Application No. 201980081880.0, mailed on Sep. 19, 2024, 12 pages. (English Translation Provided).

"Office Action Issued in Indian Patent Application No. 202147025539", Mailed Date: Jan. 12, 2023, 6 Pages.

"Notice of Allowance Issued in European Patent Application No. 19824166.3", Mailed Date: Jun. 21, 2023, 8 Pages.

"Notice of Allowance Issued in European Patent Application No. 19824166.3", Mailed Date: Sep. 1, 2023, 8 Pages.

Notice of Allowance Received for Chinese Application No. 201980081880.0, mailed on Jan. 28, 2025, 04 pages. (English Translation Provided).

Decision to Grant received for EP Application No. 19824166.3, mailed on Jan. 5, 2024, 2 pages.

Intimation of Grant for Indian Application No. 202147025539, mailed on Feb. 24, 2025, 1 page.

\* cited by examiner

FIG. 4
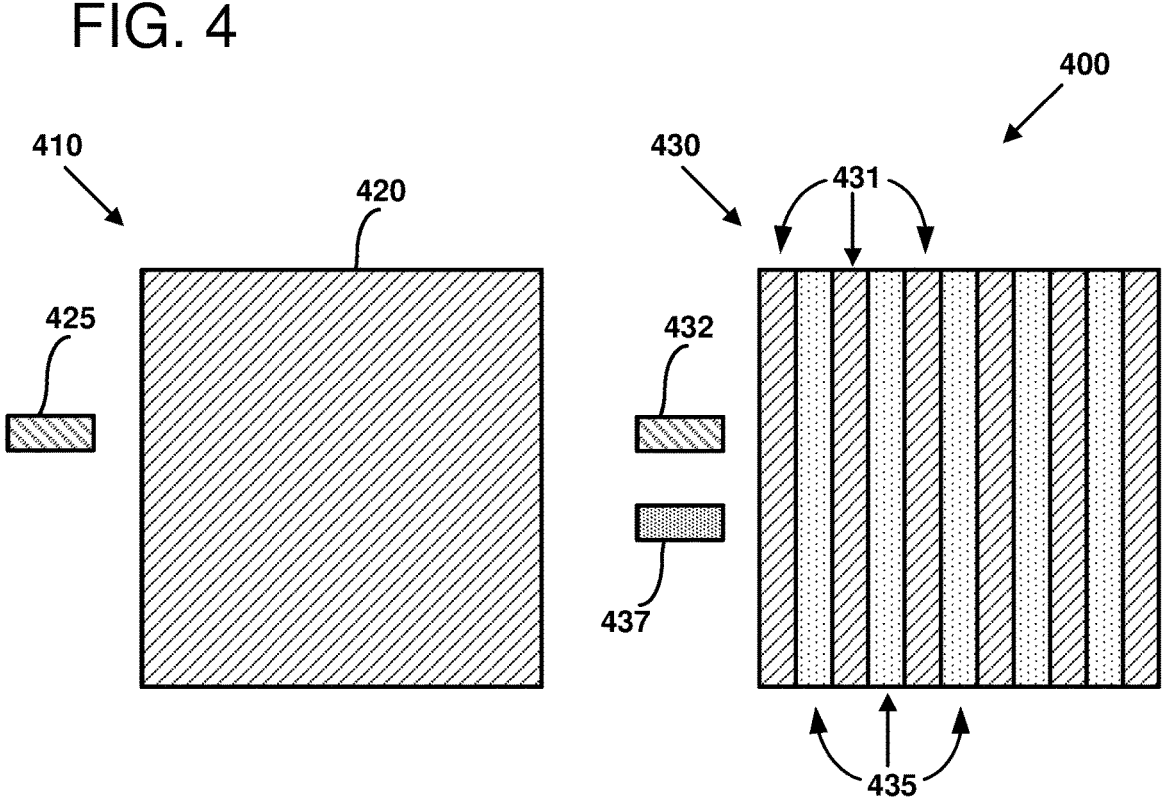
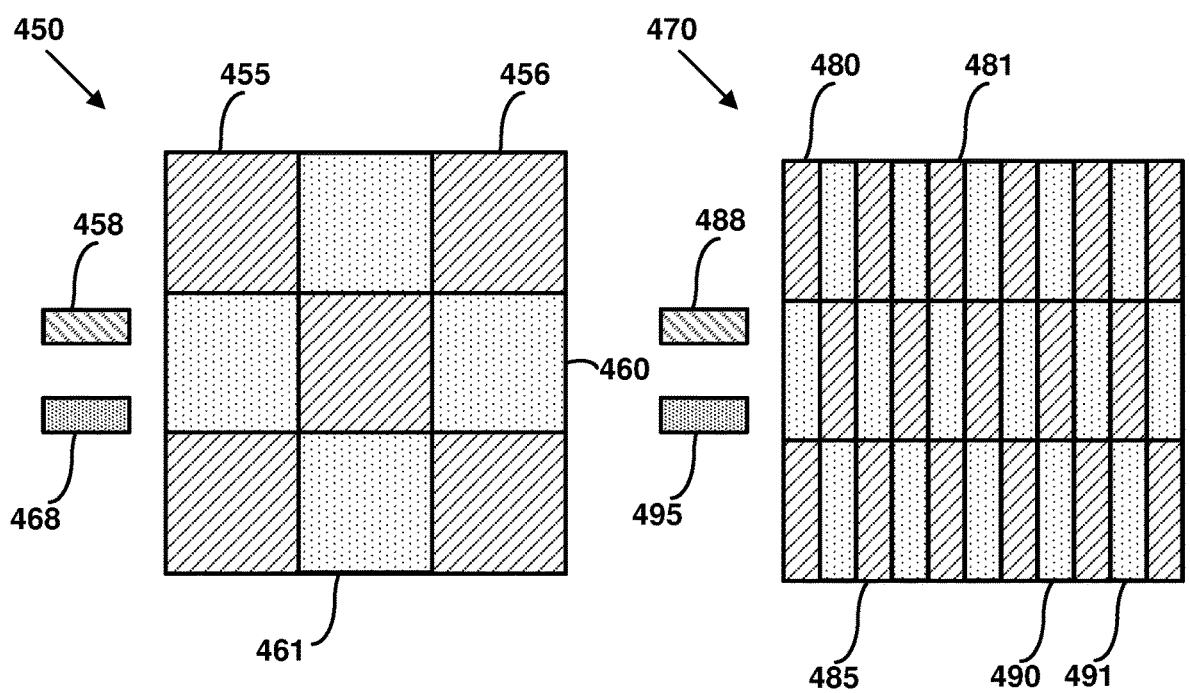

RESIDUAL QUANTIZATION FOR NEURAL NETWORKS

CROSS-REFERENCE TO RELATED APPLICATION

This application is a continuation of U.S. application Ser. No. 16/221,187, filed Dec. 14, 2018, which application is incorporated herein by reference in its entirety.

BACKGROUND

Machine learning (ML) and artificial intelligence (AI) techniques can be useful for solving a number of complex computational problems such as recognizing images and speech, analyzing and classifying information, and performing various classification tasks. Machine learning is a field of computer science that uses statistical techniques to give computer systems the ability to extract higher-level features from a set of training data. Specifically, the features can be extracted by training a model such as an artificial neural network (NN) or a deep neural network (DNN). After the model is trained, new data can be applied to the model and the new data can be classified (e.g., higher-level features can be extracted) using the trained model. Machine learning models are typically executed on a general-purpose processor (also referred to as a central processing unit (CPU)). However, training the models and/or using the models can be computationally expensive and so it may not be possible to perform feature extraction in real-time using general-purpose processors. Accordingly, there is ample opportunity for improvements in computer hardware and software to implement neural networks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technology related to training a neural network accelerator using mixed precision data formats is disclosed. In one example of the disclosed technology, a neural network accelerator is configured to accelerate a given layer of a multi-layer neural network. An input tensor for the given layer can be converted from a normal-precision floating-point format to a quantized-precision floating-point format. A tensor operation can be performed using the converted input tensor. A result of the tensor operation can be converted from the block floating-point format to the normal-precision floating-point format. The converted result can be used to generate an output tensor of the layer of the neural network, where the output tensor is in normal-precision floating-point format.

In one embodiment, a node circuit is disclosed that can select a higher precision mode or a lower precision mode on a node or layer basis based on a variety of input metrics. When converting to a quantized tensor, a residual tensor is produced. An error value associated with converting from a normal-precision floating point number to the quantized tensor is used to determine whether to use the residual tensor in a dot product calculation. Using the residual tensor increases the precision of an output from a node. Selection of whether to use the residual tensor can depend on various input metrics including the error value, the layer number, the exponent value, the layer type, etc.

The foregoing and other objects, features, and advantages of the invention will become more apparent from the following detailed description, which proceeds with reference to the accompanying figures.

BRIEF DESCRIPTION OF THE DRAWINGS

FIG. 4 depicts a number of alternative block floating-point formats that can be used to represent quantized neural network models, as can be used in certain examples of the disclosed technology.

DETAILED DESCRIPTION

I. General Considerations

Figure 1:
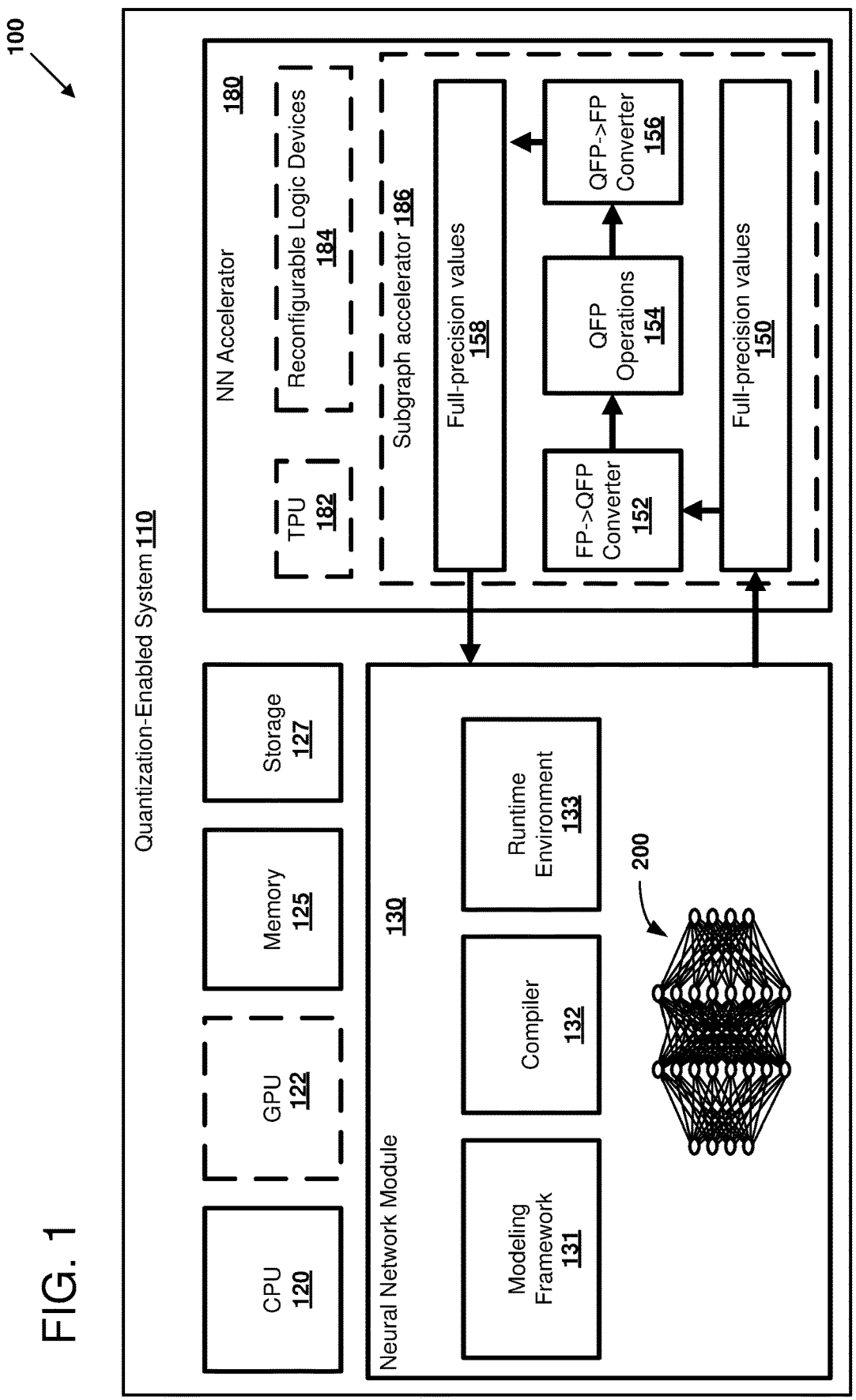
FIG. 1 is a block diagram of a quantization-enabled system, as can be implemented in certain examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "verify," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Overview

Artificial Neural Networks (ANNs or as used throughout herein, "NNs") are applied to a number of applications in Artificial Intelligence and Machine Learning including image recognition, speech recognition, search engines, and other suitable applications. The processing for these applications may take place on individual devices such as personal computers or cell phones, but it may also be performed in large datacenters. At the same time, hardware accelerators that can be used with NNs include specialized NN processing units, such as tensor processing units (TPUs) and Field Programmable Gate Arrays (FPGAs) programmed to accelerate neural network processing. Such hardware devices are being deployed in consumer devices as well as in data centers due to their flexible nature and low power consumption per unit computation.

Traditionally NNs have been trained and deployed using single-precision floating-point (32-bit floating-point or float32 format). However, it has been shown that lower precision floating-point formats, such as 16-bit floating-point (float16) or fixed-point can be used to perform inference operations with minimal loss in accuracy. On specialized hardware, such as FPGAs, reduced precision formats can greatly improve the latency and throughput of DNN processing.

Numbers represented in normal-precision floating-point format (e.g., a floating-point number expresses in a 16-bit floating-point format, a 32-bit floating-point format, a 64-bit floating-point format, or an 80-bit floating-point format) can be converted to quantized-precision format numbers may allow for performance benefits in performing operations. In particular, NN weights and activation values can be represented in a lower-precision quantized format with an acceptable level of error introduced. Examples of lower-precision quantized formats include formats having a reduced bit width (including by reducing the number of bits used to represent a number's mantissa or exponent) and block floating-point formats where two or more numbers share the same single exponent.

One of the characteristics of computation on an FPGA device is that it typically lacks hardware floating-point support. Floating-point operations may be performed at a penalty using the flexible logic, but often the amount of logic needed to support floating-point is prohibitive in FPGA implementations. Some newer FPGAs have been developed that do support floating-point computation, but even on these the same device can produce twice as many computational outputs per unit time as when it is used in an integer mode. Typically, NNs are created with floating-point computation in mind, but when an FPGA is targeted for NN processing it would be beneficial if the neural network could be expressed using integer arithmetic. Examples of the disclosed technology include hardware implementations of block Floating-point (BFP), including the use of BFP in NN, FPGA, and other hardware environments.

A typical floating-point representation in a computer system consists of three parts: sign(s), exponent (e), and mantissa (m). The sign indicates if the number is positive or negative. The exponent and mantissa are used as in scientific notation:

$$\text{Value} = s \times m \times 2^e$$

Any number may be represented, within the precision limits of the mantissa. Since the exponent scales the mantissa by powers of 2, just as the exponent does by powers of 10 in scientific notation, the magnitudes of very large numbers may be represented. The precision of the representation is determined by the precision of the mantissa. Typical floating-point representations use a mantissa of 10 (float 16), 24 (float 32), or 53 (float64) bits in width. An integer with magnitude greater than 253 can be approximated in a float64 floating-point format, but it will not be represented exactly because there are not enough bits in the mantissa. A similar effect can occur for arbitrary fractions where the fraction is represented by bits of the mantissa that take on the value of negative powers of 2. There are many fractions that cannot be exactly represented because they are irrational in a binary number system. More exact representations are possible in both situations, but they may require the mantissa to contain more bits. Ultimately, an infinite number of mantissa bits are required to represent some numbers exactly (e.g., $$\frac{1}{3} = 0.\overline{3}; \frac{22}{7} = 3.\overline{142857}).$$

The 10-bit (half precision float), 24-bit (single precision float), and 53-bit (double precision float) mantissa limits are common compromises of mantissa storage requirements versus representation precision in general-purpose computers.

With block floating-point formats, a group of two or more numbers use a single shared exponent with each number still having its own sign and mantissa. In some examples, the shared exponent is chosen to be the largest exponent of the original floating-point values. For purposes of the present disclosure, the term block floating-point (BFP) means a number system in which a single exponent is shared across two or more values, each of which is represented by a sign and mantissa pair (whether there is an explicit sign bit, or the mantissa itself is signed). In some examples, all values of one or more rows or columns of a matrix or vector, or all values of a matrix or vector, can share a common exponent. In other examples, the BFP representation may be unsigned. In some examples, some but not all of the elements in a matrix or vector BFP representation may include numbers represented as integers, floating-point numbers, fixed point numbers, symbols, or other data formats mixed with numbers represented with a sign, mantissa, and exponent. In some examples, some or all of the elements in a matrix or vector BFP representation can include complex elements having two or more parts, for example: complex numbers with an imaginary component (a+bi, where $i=\sqrt{-1}$); fractions including a numerator and denominator, in polar coordinates (r, θ), or other multi-component element.

BFP formats can be used to tradeoff precision and storage requirements, in a fashion that is similar in some respects to normal floating-point. First, rather than storing an exponent with every floating-point number, a group of numbers can share the same exponent. To share exponents while maintaining a high level of accuracy, the numbers should have close to the same magnitude, since differences in magnitude are expressed in the mantissa. If the differences in magnitude are too great, the mantissa will overflow for the large values, or may be zero ("underflow") for the smaller values. Depending on a particular application, some amount of overflow and/or underflow may be acceptable.

The size of the mantissa can be adjusted to fit a particular application. This can affect the precision of the number being represented, but potential gains are realized from a reduced representation size. For example, a normal single-precision float has a size of four bytes, but for certain implementations of the disclosed technology, only two bytes are used to represent the sign and mantissa of each value. In some implementations, the sign and mantissa of each value can be represented in a byte or less.

In certain examples of the disclosed technology, the representation expressed above is used to derive the original number from the representation, but only a single exponent is stored for a group of numbers, each of which is represented by a signed mantissa. Each signed mantissa can be represented by two bytes or less, so in comparison to four-byte floating-point, the memory storage savings is about 2×. Further, the memory bandwidth requirements of loading and storing these values are also approximately one-half that of normal floating-point.

Neural network operations are used in many artificial intelligence operations. Often, the bulk of the processing operations performed in implementing a neural network is in performing Matrix×Matrix or Matrix× Vector multiplications or convolution operations. Such operations are compute- and memory-bandwidth intensive, where the size of a matrix may be, for example, 1000×1000 elements (e.g., 1000×1000 numbers, each including a sign, mantissa, and exponent) or larger and there are many matrices used. As discussed herein, BFP techniques can be applied to such operations to reduce the demands for computation as well as memory bandwidth in a given system, whether it is an FPGA, CPU or another hardware platform. As used herein, the use of the term "element" herein refers to a member of such a matrix or vector.

As used herein, the term "tensor" refers to a multi-dimensional array that can be used to represent properties of a NN and includes one-dimensional vectors as well as two-, three-, four-, or larger dimension matrices. As used in this disclosure, tensors do not require any other mathematical properties unless specifically stated.

As used herein, the term "normal-precision floating-point" refers to a floating-point number format having a mantissa, exponent, and optionally a sign and which is natively supported by a native or virtual CPU. Examples of normal-precision floating-point formats include, but are not limited to, IEEE 754 standard formats such as 16-bit, 32-bit, 64-bit, or to other processors supported by a processor, such as Intel AVX, AVX2, IA32, and x86_64 80-bit floating-point formats.

A given number can be represented using different precision (e.g., mixed precision) formats. For example, a number can be represented in a higher precision format (e.g., float32) and a lower precision format (e.g., float16). Lowering the precision of a number can include reducing the number of bits used to represent the mantissa or exponent of the number. Additionally, lowering the precision of a number can include reducing the range of values that can be used to represent an exponent of the number, such as when multiple numbers share a common exponent. Similarly, increasing the precision of a number can include increasing the number of bits used to represent the mantissa or exponent of the number. Additionally, increasing the precision of a number can include increasing the range of values that can be used to represent an exponent of the number, such as when a number is separated from a group of numbers that shared a common exponent. As used herein, converting a number from a higher precision format to a lower precision format may be referred to as down-casting or quantizing the number. Converting a number from a lower precision format to a higher precision format may be referred to as up-casting or de-quantizing the number.

As used herein, the term "quantized-precision floating-point" refers to a floating-point number format where two or more values of a tensor have been modified to have a lower precision than when the values are represented in normal-precision floating-point. In particular, many examples of quantized-precision floating-point representations include block floating-point formats, where two or more values of the tensor are represented with reference to a common exponent. The quantized-precision floating-point number can be generated by selecting a common exponent for two, more, or all elements of a tensor and shifting mantissas of individual elements to match the shared, common exponent. In some examples, groups of elements within a tensor can share a common exponent on, for example, a per-row, per-column, per-tile, or other basis.

In one example of the disclosed technology, a neural network accelerator is configured to accelerate a given layer of a multi-layer neural network using mixed precision data formats. For example, the mixed precision data formats can include a normal-precision floating-point format and a quantized-precision floating-point format. An input tensor for the given layer can be converted from a normal-precision floating-point format to a quantized-precision floating-point format. A tensor operation can be performed using the converted input tensor. A result of the tensor operation can be converted from the block floating-point format to the normal-precision floating-point format. The converted result can be used to generate an output tensor of the layer of the neural network, where the output tensor is in normal-precision floating-point format. In this manner, the neural network accelerator can potentially be made smaller and more efficient than a comparable accelerator that uses only a normal-precision floating-point format. A smaller and more efficient accelerator may have increased computational performance and/or increased energy efficiency. Additionally, the neural network accelerator can potentially have increased accuracy compared to an accelerator that uses only a quantized-precision floating-point format. By increasing the accuracy of the accelerator, a convergence time for training may be decreased and the accelerator may be more accurate when classifying inputs to the neural network.

III. Example Architectures for Using Mixed Precision Floating-Point to Train Neural Networks FIG. 1 is a block diagram 100 outlining an example quantization-enabled system 110 as can be implemented certain examples of the disclosed technology. As shown in FIG. 1, the quantization-enabled system 110 can include a number of hardware resources including general-purpose processors 120 and special-purpose processors such as graphics processing units 122 and neural network accelerator 180. The processors are coupled to memory 125 and storage 127, which can include volatile or non-volatile memory devices. The processors 120 and 122 execute instructions stored in the memory or storage in order to provide a neural network module 130. The neural network module 130 includes software interfaces that allow the system to be programmed to implement various types of neural networks. For example, software functions can be provided that allow applications to define neural networks including weights, biases, activation functions, node values, and interconnections between layers of a neural network. Additionally, software functions can be used to define state elements for recurrent neural networks. The neural network module 130 can further provide utilities to allow for training and retraining of a neural network implemented with the module. Values representing the neural network module are stored in memory or storage and are operated on by instructions executed by one of the processors. The values stored in memory or storage can be represented using normal-precision floating-point and/or quantized floating-point values.

In some examples, proprietary or open source libraries or frameworks are provided to a programmer to implement neural network creation, training, and evaluation. Examples of such libraries include TensorFlow, Microsoft Cognitive Toolkit (CNTK), Caffe, Theano, and Keras. In some examples, programming tools such as integrated development environments provide support for programmers and users to define, compile, and evaluate NNs.

The neural network accelerator 180 can be implemented as a custom or application-specific integrated circuit (e.g., including a system-on-chip (SoC) integrated circuit), as a field programmable gate array (FPGA) or other reconfigurable logic, or as a soft processor virtual machine hosted by a physical, general-purpose processor. The neural network accelerator 180 can include a tensor processing unit 182, reconfigurable logic devices 184, and/or one or more neural processing cores (such as the subgraph accelerator 186). The subgraph accelerator 186 can be configured in hardware, software, or a combination of hardware and software. As one example, the subgraph accelerator 186 can be configured and/or executed using instructions executable on the tensor processing unit 182. As another example, the subgraph accelerator 186 can be configured by programming reconfigurable logic blocks 184. As another example, the subgraph accelerator 186 can be configured using hard-wired logic gates of the neural network accelerator 180.

The subgraph accelerator 186 can be programmed to execute a subgraph or an individual node of a neural network. For example, the subgraph accelerator 186 can be programmed to execute a subgraph included a layer of a NN. The subgraph accelerator 186 can access a local memory used for storing weights, biases, input values, output values, and so forth. The subgraph accelerator 186 can have many inputs, where each input can be weighted by a different weight value. For example, the subgraph accelerator 186 can produce a dot product of an input tensor and the programmed input weights for the subgraph accelerator 186. In some examples, the dot product can be adjusted by a bias value before it is used as an input to an activation function. The output of the subgraph accelerator 186 can be stored in the local memory, where the output value can be accessed and sent to a different NN processor core and/or to the neural network module 130 or the memory 125, for example.

The neural network accelerator 180 can include a plurality 110 of subgraph accelerators 186 that are connected to each other via an interconnect (not shown). The interconnect can carry data and control signals between individual subgraph accelerators 186, a memory interface (not shown), and an input/output (I/O) interface (not shown). The interconnect can transmit and receive signals using electrical, optical, magnetic, or other suitable communication technology and can provide communication connections arranged according to a number of different topologies, depending on a particular desired configuration. For example, the interconnect can have a crossbar, a bus, a point-to-point bus, or other suitable topology. In some examples, any one of the plurality of subgraph accelerators 186 can be connected to any of the other cores, while in other examples, some cores are only connected to a subset of the other cores. For example, each core may only be connected to a nearest 4, 8, or 10 neighboring cores. The interconnect can be used to transmit input/output data to and from the subgraph accelerators 186, as well as transmit control signals and other information signals to and from the subgraph accelerators 186. For example, each of the subgraph accelerators 186 can receive and transmit semaphores that indicate the execution status of operations currently being performed by each of the respective subgraph accelerators 186. Further, matrix and vector values can be shared between subgraph accelerators 186 via the interconnect. In some examples, the interconnect is implemented as wires connecting the subgraph accelerators 186 and memory system, while in other examples, the core interconnect can include circuitry for multiplexing data signals on the interconnect wire(s), switch and/or routing components, including active signal drivers and repeaters, or other suitable circuitry. In some examples of the disclosed technology, signals transmitted within and to/from neural network accelerator 180 are not limited to full swing electrical digital signals, but the neural network accelerator 180 can be configured to include differential signals, pulsed signals, or other suitable signals for transmitting data and control signals.

In some examples, the quantization-enabled system 110 can include an optional quantization emulator that emulates functions of the neural network accelerator 180. The neural network accelerator 180 provides functionality that can be used to convert data represented in full precision floating-point formats in the neural network module 130 into quantized format values. The neural network accelerator 180 can also perform operations using quantized format values. Such functionality will be discussed in further detail below.

The neural network module 130 can be used to specify, train, and evaluate a neural network model using a tool flow that includes a hardware-agnostic modelling framework 131 (also referred to as a native framework or a machine learning execution engine), a neural network compiler 132, and a neural network runtime environment 133. The memory includes computer-executable instructions for the tool flow including the modelling framework 131, the neural network compiler 132, and the neural network runtime environment 133. The tool flow can be used to generate neural network data 200 representing all or a portion of the neural network model, such as the neural network model discussed below regarding FIG. 2. It should be noted that while the tool flow is described as having three separate tools (131, 132, and 133), the tool flow can have fewer or more tools in various examples. For example, the functions of the different tools (131, 132, and 133) can be combined into a single modelling and execution environment.

The neural network data 200 can be stored in the memory 125. The neural network data 200 can be represented in one or more formats. For example, the neural network data 200 corresponding to a given neural network model can have a different format associated with each respective tool of the tool flow. Generally, the neural network data 200 can include a description of nodes, edges, groupings, weights, biases, activation functions, and/or tensor values. As a specific example, the neural network data 200 can include source code, executable code, metadata, configuration data, data structures and/or files for representing the neural network model.

The modelling framework 131 can be used to define and use a neural network model. As one example, the modelling framework 131 can include pre-defined APIs and/or programming primitives that can be used to specify one or more aspects of the neural network model. The pre-defined APIs can include both lower-level APIs (e.g., activation functions, cost or error functions, nodes, edges, and tensors) and higher-level APIs (e.g., layers, convolutional neural networks, recurrent neural networks, linear classifiers, and so forth). "Source code" can be used as an input to the modelling framework 131 to define a topology of the graph of a given neural network model. In particular, APIs of the modelling framework 131 can be instantiated and interconnected within the source code to specify a complex neural network model. A data scientist can create different neural network models by using different APIs, different numbers of APIs, and interconnecting the APIs in different ways.

In addition to the source code, the memory 125 can also store training data. The training data includes a set of input data for applying to the neural network model 200 and a desired output from the neural network model for each respective dataset of the input data. The modelling framework 131 can be used to train the neural network model with the training data. An output of the training is the weights and biases that are associated with each node of the neural network model. After the neural network model is trained, the modelling framework 131 can be used to classify new data that is applied to the trained neural network model. Specifically, the trained neural network model uses the weights and biases obtained from training to perform classification and recognition tasks on data that has not been used to train the neural network model. The modelling framework 131 can use the CPU 120 and the special-purpose processors (e.g., the GPU 122 and/or the neural network accelerator 180) to execute the neural network model with increased performance as compare with using only the CPU 120. In some examples, the performance can potentially achieve real-time performance for some classification tasks.

The compiler 132 analyzes the source code and data (e.g., the examples used to train the model) provided for a neural network model and transforms the model into a format that can be accelerated on the neural network accelerator 180, which will be described in further detail below. Specifically, the compiler 132 transforms the source code into executable code, metadata, configuration data, and/or data structures for representing the neural network model and memory as neural network data 200. In some examples, the compiler 132 can divide the neural network model into portions (e.g., neural network 200) using the CPU 120 and/or the GPU 122) and other portions (e.g., a neural network subgraph) that can be executed on the neural network accelerator 180. The compiler 132 can generate executable code (e.g., runtime modules) for executing subgraphs assigned to the CPU 120 and for communicating with the subgraphs assigned to the accelerator 180. The compiler 132 can generate configuration data for the accelerator 180 that is used to configure accelerator resources to evaluate the subgraphs assigned to the optional accelerator 180. The compiler 132 can create data structures for storing values generated by the neural network model during execution and/or training and for communication between the CPU 120 and the accelerator 180. The compiler 132 can generate metadata that can be used to identify subgraphs, edge groupings, training data, and various other information about the neural network model during runtime. For example, the metadata can include information for interfacing between the different subgraphs of the neural network model.

The runtime environment 133 provides an executable environment or an interpreter that can be used to train the neural network model during a training mode and that can be used to evaluate the neural network model in training, inference, or classification modes. During the inference mode, input data can be applied to the neural network model inputs and the input data can be classified in accordance with the training of the neural network model. The input data can be archived data or real-time data.

The runtime environment 133 can include a deployment tool that, during a deployment mode, can be used to deploy or install all or a portion of the neural network to neural network accelerator 180. The runtime environment 133 can further include a scheduler that manages the execution of the different runtime modules and the communication between the runtime modules and the neural network accelerator 180. Thus, the runtime environment 133 can be used to control the flow of data between nodes modeled on the neural network module 130 and the neural network accelerator 180.

In one example, the neural network accelerator 180 receives and returns normal-precision values 150 from the neural network module 130. As illustrated in FIG. 1, the subgraph accelerator 186 can perform a bulk of its operations using quantized floating-point and an interface between the subgraph accelerator 186 and the neural network module 130 can use full-precision values for communicating information between the modules. The normal-precision values can be represented in 16-, 32-, 64-bit, or other suitable floating-point format. For example, a portion of values representing the neural network can be received, including edge weights, activation values, or other suitable parameters for quantization. The normal-precision values 150 are provided to a normal-precision floating-point to quantized floating-point converter 152, which converts the normal-precision value into quantized values. Quantized floating-point operations 154 can then be performed on the quantized values. The quantized values can then be converted back to a normal-floating-point format using a quantized floating-point to normal-floating-point converter which produces normal-precision floating-point values. As a specific example, the subgraph accelerator 186 can be used to accelerate a given layer of a neural network, and the vector-vector, matrix-vector, matrix-matrix, and convolution operations can be performed using quantized floating-point operations and less compute-intensive operations (such as adding a bias value or calculating an activation function) can be performed using normal-floating-point operations.

The conversions between normal floating-point and quantized floating-point performed by the converters 152 and 156 are typically performed on sets of numbers represented as vectors or multi-dimensional matrices. In some examples, additional normal-precision operations 158, including operations that may be desirable in particular neural network implementations can be performed based on normal-precision formats including adding a bias to one or more nodes of a neural network, applying a hyperbolic tangent function or other such sigmoid function, or rectification functions (e.g., ReLU operations) to normal-precision values that are converted back from the quantized floating-point format.

In some examples, the quantized values are used and stored only in the logic gates and internal memories of the neural network accelerator 180, and the memory 125 and storage 127 store only normal floating-point values. For example, the neural network accelerator 180 can quantize the inputs, weights, and activations for a neural network model that are received from the neural network model 130 and can de-quantize the results of the operations that are performed on the neural network accelerator 180 before passing the values back to the neural network model 130. Values can be passed between the neural network model 130 and the neural network accelerator 180 using the memory 125, the storage 127, or an input/output interface (not shown). In other examples, an emulator provides full emulation of the quantization, including only storing one copy of the shared exponent and operating with reduced mantissa widths. Some results may differ over versions where the underlying operations are performed in normal floating-point. For example, the full emulation version can check for underflow or overflow conditions for a limited, quantized bit width (e.g., 3-, 4-, or 5-bit wide mantissas).

The bulk of the computational cost of DNNs is in vector-vector, matrix-vector, and matrix-matrix multiplications and/or convolutions. These operations are quadratic in input sizes while operations such as bias add and activation functions are linear in input size. Thus, in some examples, quantization is only applied to matrix-vector multiplication operations, which is implemented on the neural network accelerator 180. In such examples, all other operations are done in a normal-precision format, such as float16. Thus, from the user or programmer's perspective, the quantization-enabled system 110 accepts and outputs normal-precision float16 values from/to the neural network module 130 and output float16 format values. All conversions to and from block floating-point format can be hidden from the programmer or user. In some examples, the programmer or user may specify certain parameters for quantization operations. In other examples, quantization operations can take advantage of block floating-point format to reduce computation complexity, as discussed below regarding FIG. 3.

The neural network accelerator 180 is used to accelerate evaluation and/or training of a neural network graph or subgraphs, typically with increased speed and reduced latency that is not realized when evaluating the subgraph using only the CPU 120 and/or the GPU 122. In the illustrated example, the accelerator includes a Tensor Processing Unit (TPU) 182, reconfigurable logic devices 184 (e.g., contained in one or more FPGAs or a programmable circuit fabric), and/or a subgraph accelerator 186, however any suitable hardware accelerator can be used that models neural networks. The accelerator 180 can include configuration logic which provides a soft CPU. The soft CPU supervises operation of the accelerated graph or subgraph on the accelerator 180 and can manage communications with the neural network module 130. The soft CPU can also be used to configure logic and to control loading and storing of data from RAM on the accelerator, for example in block RAM within an FPGA.

In some examples, parameters of the neural network accelerator 180 can be programmable. The neural network accelerator 180 can be used to prototype training, inference, or classification of all or a portion of the neural network model 200. For example, quantization parameters can be selected based on accuracy or performance results obtained by prototyping the network within neural network accelerator 180. After a desired set of quantization parameters is selected, a quantized model can be programmed into the accelerator 180 for performing further operations.

The compiler 132 and the runtime 133 provide a fast interface between the neural network module 130 and the neural network accelerator 180. In effect, the user of the neural network model may be unaware that a portion of the model is being accelerated on the provided accelerator. For example, node values are typically propagated in a model by writing tensor values to a data structure including an identifier. The runtime 133 associates subgraph identifiers with the accelerator, and provides logic for translating the message to the accelerator, transparently writing values for weights, biases, and/or tensors to the neural network accelerator 180 without program intervention. Similarly, values that are output by the neural network accelerator 180 may be transparently sent back to the neural network module 130 with a message including an identifier of a receiving node at the server and a payload that includes values such as weights, biases, and/or tensors that are sent back to the overall neural network model.

Figure 2:
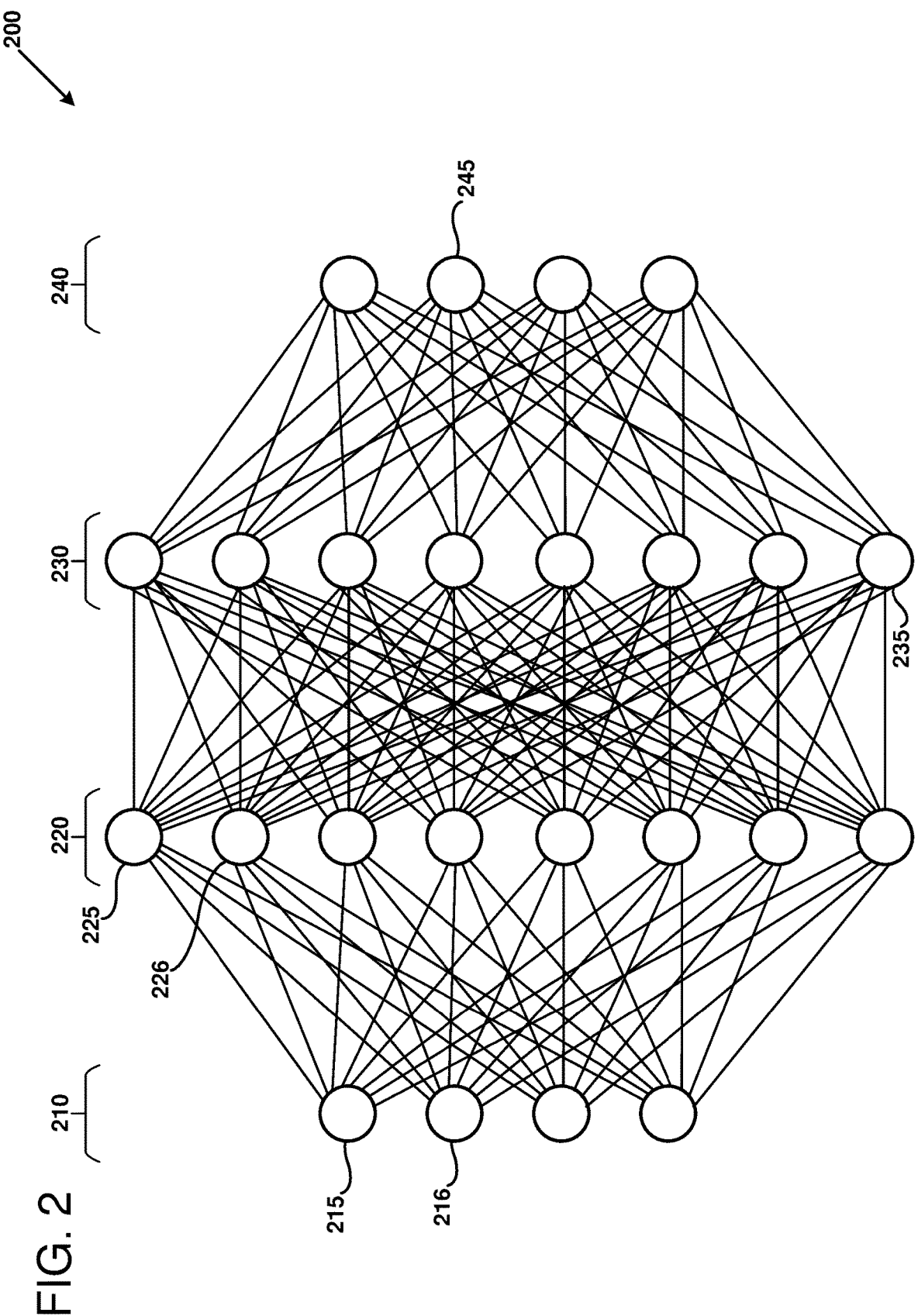
FIG. 2 is a diagram depicting a deep neural network, as can be modeled using certain example methods and apparatus disclosed herein.

FIG. 2 illustrates a simplified topology of a deep neural network (DNN) 200 that can be used to perform enhanced image processing using disclosed BFP implementations. One or more processing layers can be implemented using disclosed techniques for quantized and BFP matrix/vector operations, including the use of one or more of a plurality of neural network subgraph accelerators 186 in the quantization-enabled system 110 described above. It should be noted that applications of the neural network implementations disclosed herein are not limited to DNNs but can also be used with other types of neural networks, such as convolutional neural networks (CNNs), including implementations having Long Short Term Memory (LSTMs) or gated recurrent units (GRUs), or other suitable artificial neural networks that can be adapted to use BFP methods and apparatus disclosed herein.

The DNN 200 can operate in at least two different modes. Initially, the DNN 200 can be trained in a training mode and then used as a classifier in an inference mode. During the training mode, a set of training data can be applied to inputs of the DNN 200 and various parameters of the DNN 200 can be adjusted so that at the completion of training, the DNN 200 can be used as a classifier. Training includes performing forward propagation of the training input data, calculating a loss (e.g., determining a difference between an output of the DNN and the expected outputs of the DNN), and performing backward propagation through the DNN to adjust parameters (e.g., weights and biases) of the DNN 200. When an architecture of the DNN 200 is appropriate for classifying the training data, the parameters of the DNN 200 will converge and the training can complete. After training, the DNN 200 can be used in the inference mode. Specifically, training or non-training data can be applied to the inputs of the DNN 200 and forward propagated through the DNN 200 so that the input data can be classified by the DNN 200.

As shown in FIG. 2, a first set 210 of nodes (including nodes 215 and 216) form an input layer. Each node of the set 210 is connected to each node in a first hidden layer formed from a second set 220 of nodes (including nodes 225 and 226). A second hidden layer is formed from a third set 230 of nodes, including node 235. An output layer is formed from a fourth set 240 of nodes (including node 245). In example 200, the nodes of a given layer are fully interconnected to the nodes of its neighboring layer(s). In other words, a layer can include nodes that have common inputs with the other nodes of the layer and/or provide outputs to common destinations of the other nodes of the layer. In other examples, a layer can include nodes that have a subset of common inputs with the other nodes of the layer and/or provide outputs to a subset of common destinations of the other nodes of the layer.

During forward propagation, each of the nodes produces an output by applying a weight to each input generated from the preceding node and collecting the weights to produce an output value. In some examples, each individual node can have an activation function (o) and/or a bias (b) applied. Generally, an appropriately programmed processor or FPGA can be configured to implement the nodes in the depicted neural network 200. In some example neural networks, an output function $f(n)$ of a hidden combinational node n can produce an output expressed mathematically as:

$$f(n) = \sigma\left(\sum_{i=0 \text{ to } E-1} w_i x_i + b\right)$$

where $w_i$ is a weight that is applied (multiplied) to an input edge $x_i$, b is a bias value for the node n, $\sigma$ is the activation function of the node n, and E is the number of input edges of the node n. In some examples, the activation function produces a continuous value (represented as a floating-point number) between 0 and 1. In some examples, the activation function produces a binary 1 or 0 value, depending on whether the summation is above or below a threshold.

A given neural network can include thousands of individual nodes and so performing all of the calculations for the nodes in normal-precision floating-point can be computationally expensive. An implementation for a more computationally expensive solution can include hardware that is larger and consumes more energy than an implementation for a less computationally expensive solution. However, performing the operations using quantized floating-point or in mixed precision (using both normal-precision floating-point and quantized floating-point) can potentially reduce the computational complexity of the neural network. A simple implementation that uses only quantized floating-point may significantly reduce the computational complexity, but the implementation may have difficulty converging during training and/or correctly classifying input data because of errors introduced by the quantization. However, a mixed precision implementation can potentially increase an accuracy of some calculations while also providing the benefits of reduced complexity associated with quantized floating-point.

A mixed precision implementation of the DNN 200 can include nodes that perform operations in both normal precision floating-point and quantized floating-point. As a specific example, an output function $f(n)$ of a hidden combinational node n can produce an output expressed mathematically as:

$$f(n) = \sigma\left(Q^{-1}\left(\sum_{i=0\ to\ E-1} Q(w_i)Q(x_i)\right) + b\right)$$

where $w_i$ is a weight that is applied (multiplied) to an input edge $x_i$, $Q(w_i)$ is the quantized floating-point value of the weight, $Q(x_i)$ is the quantized floating-point value of the input sourced from the input edge $x_i$, $Q^{-1}(\ )$ is the de-quantized representation of the quantized floating-point value of the dot product of the vectors w and x, b is a bias value for the node n, σ is the activation function of the node n, and E is the number of input edges of the node n. The computational complexity can potentially be reduced (as compared with using only normal-precision floating-point values) by performing the dot product using quantized floating-point values, and the accuracy of the output function can potentially be increased by (as compared with using only quantized floating-point values) by the other operations of the output function using normal-precision floating-point values.

Neural networks can be trained and retrained by adjusting constituent values of the output function $f(n)$. For example, by adjusting weights $w_i$ or bias values b for a node, the behavior of the neural network is adjusted by corresponding changes in the networks output tensor values. For example, a cost function $C(w, b)$ can be used during back propagation to find suitable weights and biases for the network, where the cost function can be described mathematically as:

$$C(w, b) = \frac{1}{2n}\sum_{x}\|y(x) - a\|^2$$

where w and b represent all weights and biases, n is the number of training inputs, a is a vector of output values from the network for an input vector of training inputs x. By adjusting the network weights and biases, the cost function C can be driven to a goal value (e.g., to zero (0)) using various search techniques, for examples, stochastic gradient descent. The neural network is said to converge when the cost function C is driven to the goal value. Similar to the output function $f(n)$, the cost function can be implemented using mixed-precision computer arithmetic. For example, the vector operations can be performed using quantized floating-point values and operations, and the non-vector operations can be performed using normal-precision floating-point values.

Examples of suitable applications for such neural network BFP implementations include, but are not limited to: performing image recognition, performing speech recognition, classifying images, translating speech to text and/or to other languages, facial or other biometric recognition, natural language processing, automated language translation, query processing in search engines, automatic content selection, analyzing email and other electronic documents, relationship management, biomedical informatics, identifying candidate biomolecules, providing recommendations, or other classification and artificial intelligence tasks.

A network accelerator (such as the network accelerator 180 in FIG. 1) can be used to accelerate the computations of the DNN 200. As one example, the DNN 200 can be partitioned into different subgraphs that can be individually accelerated. As a specific example, each of the layers 210, 220, 230, and 240 can be a subgraph that is accelerated. The computationally expensive calculations of the layer can be performed using quantized floating-point and the less expensive calculations of the layer can be performed using normal-precision floating-point. Values can be passed from one layer to another layer using normal-precision floating-point By accelerating a group of computations for all nodes within a layer, some of the computations can be reused and the computations performed by the layer can be reduced compared to accelerating individual nodes.

In some examples, a set of parallel multiply-accumulate (MAC) units in each convolutional layer can be used to speed up the computation. Also, parallel multiplier units can be used in the fully-connected and dense-matrix multiplication stages. A parallel set of classifiers can also be used. Such parallelization methods have the potential to speed up the computation even further at the cost of added control complexity.

As will be readily understood to one of ordinary skill in the art having the benefit of the present disclosure, the application of neural network implementations can be used for different aspects of using neural networks, whether alone or in combination or subcombination with one another. For example, disclosed implementations can be used to implement neural network training via gradient descent and/or back propagation operations for a neural network. Further, disclosed implementations can be used for evaluation of neural networks.

Figure 3:
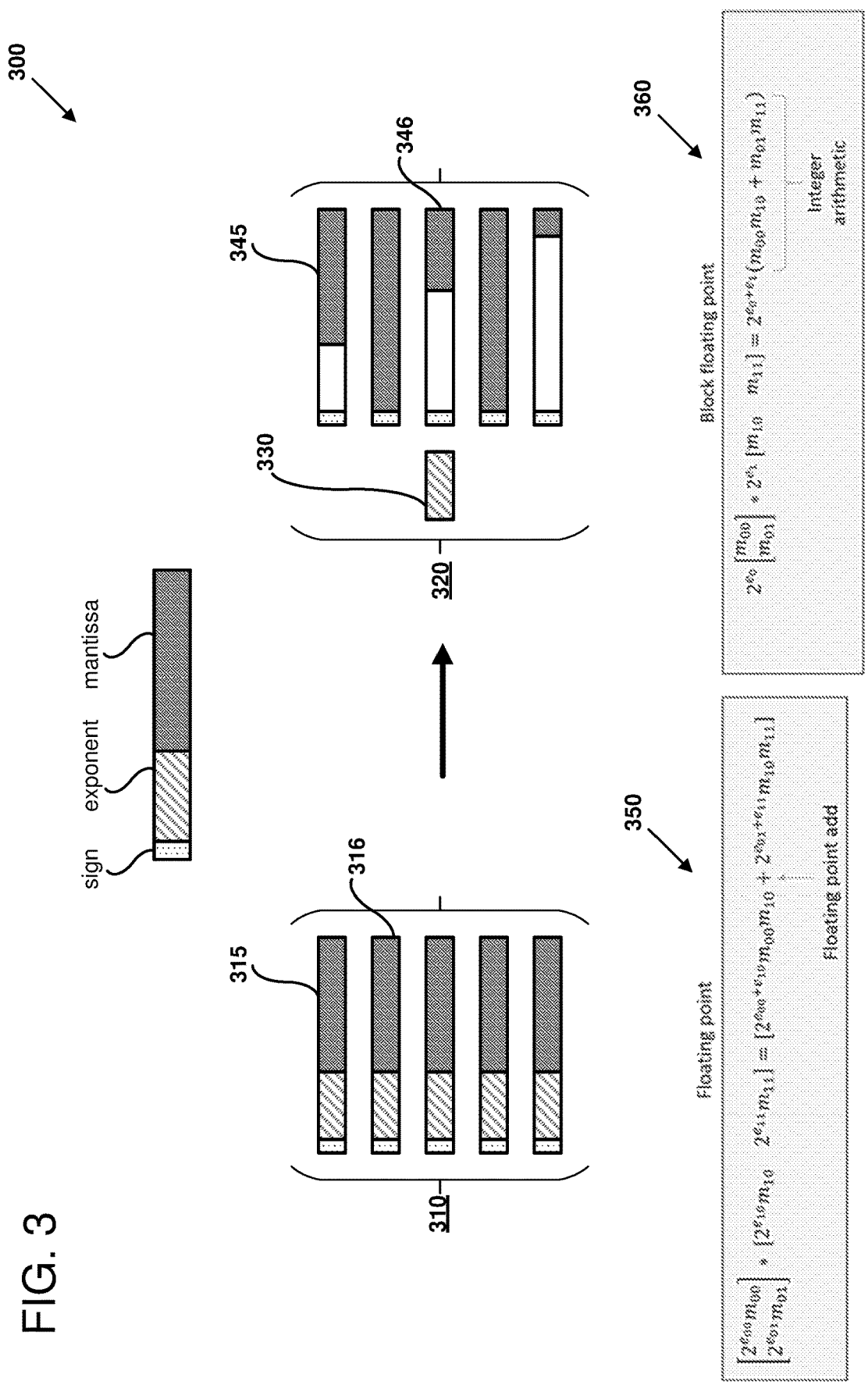
FIG. 3 is a diagram depicting certain aspects of converting a normal floating-point format to a quantized floating-point format, as can be performed in certain examples of the disclosed technology.

FIG. 3 is a diagram 300 illustrating an example of converting a normal floating-point format to a quantized, block floating-point format, as can be used in certain examples of the disclosed technology. For example, input tensors for a neural network represented as normal floating-point numbers (for example, in a 32-bit or 16-bit floating-point format) can be converted to the illustrated block floating-point format.

As shown, a number of normal floating-point format numbers 310 are represented such that each number for example number 315 or number 316 include a sign, an exponent, and a mantissa. For example, for IEEE 754 half precision floating-point format, the sign is represented using one bit, the exponent is represented using 5 bits, and the mantissa is represented using 10 bits. When the floating-point format numbers 310 in the neural network model 200 are converted to a set of quantized precision, block floating-point format numbers, there is one exponent value that is shared by all of the numbers of the illustrated set. Thus, as shown, the set of block floating-point numbers 320 are represented by a single exponent value 330, while each of the set of numbers includes a sign and a mantissa. However, since the illustrated set of numbers have different exponent values in the floating-point format, each number's respective mantissa may be shifted such that the same or a proximate number is represented in the quantized format (e.g., shifted mantissas 345 and 346).

Further, as shown in FIG. 3, use of block floating-point format can reduce computational resources required for certain common operations. In the illustrated example, a dot product of two floating-point vectors is illustrated in formal floating-point format (350) and in block floating-point format (360). For numbers represented in the normal-precision floating-point format operation 350, a floating-point addition is required to perform the dot product operation. In a dot product of floating-point vectors, the summation is performed in floating-point which can require shifts to align values with different exponents. On the other hand, for the block floating-point dot product operation 360, the product can be calculated using integer arithmetic to combine mantissa elements as shown. In other words, since the exponent portion can be factored in the block floating-point representation, multiplication and addition of the mantissas can be done entirely with fixed point or integer representations. As a result, large dynamic range for the set of numbers can be maintained with the shared exponent while reducing computational costs by using more integer arithmetic, instead of floating-point arithmetic. In some examples, operations performed by the quantization emulator 140 can be optimized to take advantage of block floating-point format.

In some examples, the shared exponent 330 is selected to be the largest exponent from among the original normal-precision numbers in the neural network model 200. In other examples, the shared exponent may be selected in a different manner, for example, by selecting an exponent that is a mean or median of the normal floating-point exponents, or by selecting an exponent to maximize dynamic range of values stored in the mantissas when their numbers are converted to the quantized number format. It should be noted that some bits of the quantized mantissas may be lost if the shared exponent and the value's original floating-point exponent are not the same. This occurs because the mantissa is shifted to correspond to the new, shared exponent.

There are several possible choices for which values in a block floating-point tensor will share an exponent. The simplest choice is for an entire matrix or vector to share an exponent. However, sharing an exponent over a finer granularity can reduce errors because it increases the likelihood of BFP numbers using a shared exponent that is closer to their original normal floating-point format exponent. Thus, loss of precision due to dropping mantissa bits (when shifting the mantissa to correspond to a shared exponent) can be reduced.

For example, consider multiplying a row-vector x by matrix W: y=xW. If an exponent is shared for each column of W, then each dot-product xW; (where $W_j$ is the j-th column of W) only involves one shared exponent for x and one shared exponent for $W_j$.

Figure 5:
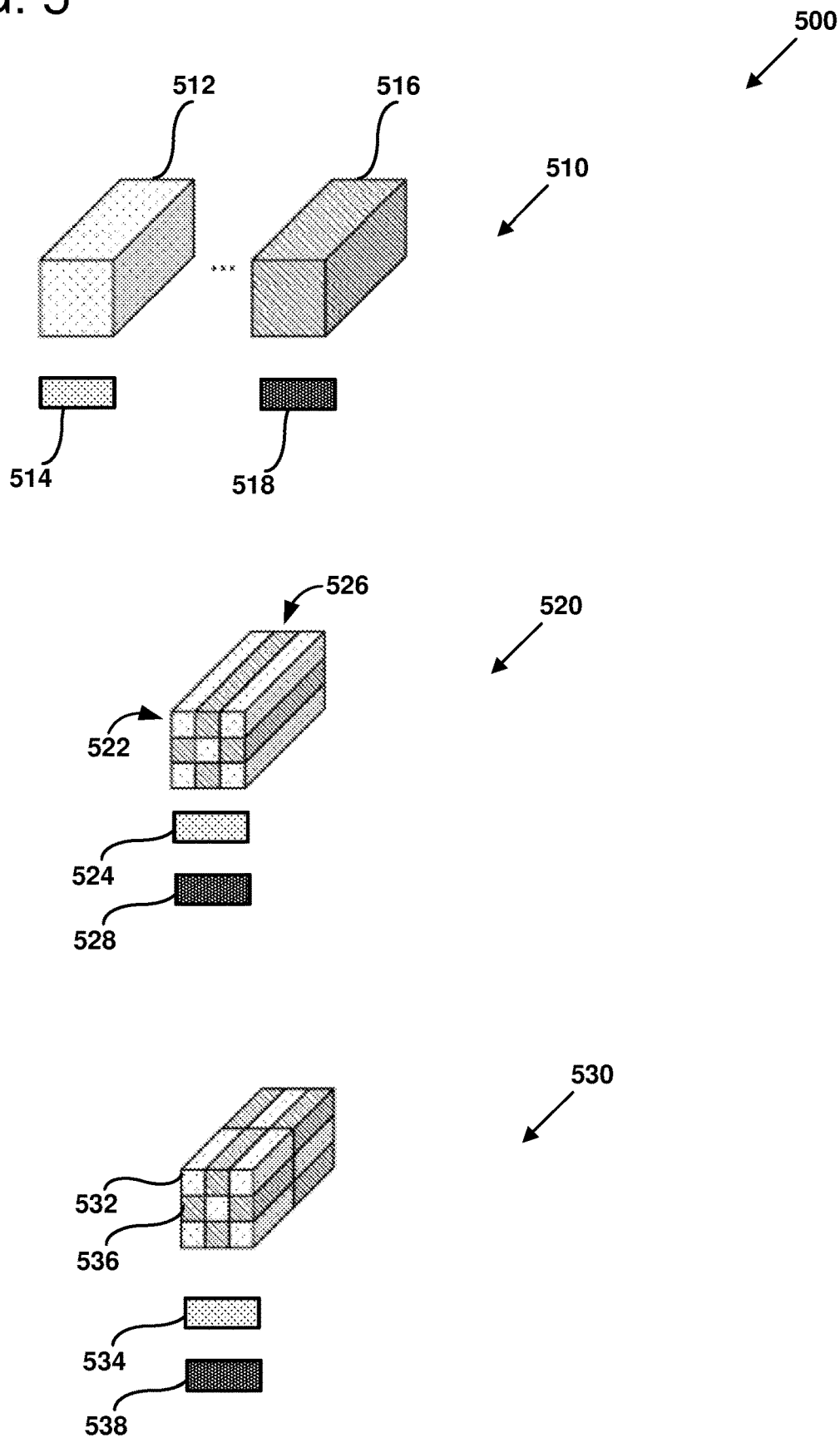
FIG. 5 depicts a number of alternative block floating-point formats that can be used to represent quantized neural network models, as can be used in certain examples of the disclosed technology.

FIGS. 4 and 5 illustrate alternative block floating-point formats that can be used for computation of neural networks. In the context of neural nets, a core operation is to perform a dot product. For example, dot products are the core computation of matrix multiplication and convolutions. Matrix multiplication involves dot products of the rows/columns of the matrix with an input vector. Convolutions involve dot products of filters with windows of the input. In the context of quantized floating-point, the group of values selected to share an exponent can have an impact on the complexity of the computer arithmetic logic used for calculating the dot product. The values sharing an exponent can be referred to as the values within a bounding box. The shape of bounding boxes can potentially impact quantization error and computation cost. While clustering similar magnitude values to create bounding boxes can reduce quantization error, tracking scaling factors for arbitrary bounding box shapes may be expensive. Instead, matrices and filters can be partitioned into bounding boxes that are potentially more efficient for the operations performed by a neural network. Specifically, an appropriate selection of the bounding box can reduce the complexity of computer arithmetic circuits that are used to implement the operations of the neural network. FIG. 4 illustrates block floating-point formats that may be well suited for matrices and FIG. 5 illustrates block floating-point formats that may be well suited for convolution filters.

FIG. 4 is a diagram 400 illustrating four alternative block floating-point formats, as can be used in certain examples of the disclosed technology. As shown, a first format 410 represents an entire array 420 of values that share a single exponent 425. In other words, the entire array 420 of values is encapsulated within a single bounding box.

In a second format 430, a common exponent is shared on a per-column basis. In other words, the columns of the matrix are the bounding box for the values. Thus, in this particular example, block floating-point values stored in even columns 431 of a matrix each share a first, single exponent 432. Block floating-point values stored in odd columns 435 each share a second, single exponent 437. In other examples, each column of an array can be associated with a different shared exponent. For an eleven-column tile in the alternative format, there can be eleven corresponding shared exponents, one shared exponent per column. In other examples, each row of an array can be associated with a different shared exponent, or odd and even rows can be associated with a shared common exponent.

A third format 450 is shown where groups of elements in an array share a common exponent. For example, if a 15×15 matrix of values shares in exponent according to the third format 450, a first set of 5×5 element groups 455 and 456 share a single shared exponent 458. Similarly, a second 5×5 element group of elements in the array 460 and 461 can each shared a second single exponent 468. In other examples, each of the tiles can be associated with its own respective shared exponent. In the example format 450, there could be nine shared exponents for the 15×15 matrix.

A fourth format 470 is shown where two shared exponents are shared on a tiling plus per-column basis. Thus, a first set of numbers including numbers 480, 481, and 485 all share a single common exponent 488. Similarly, a second set of numbers including a set 490 and 491 each share a second, different single exponent 495. In an alternative example, each of the groups shown can have its own shared exponent.

In some examples, the computational cost of matrix-vector multiplication can be further reduced by reducing mantissa widths. A large range of values having a shared common exponent can be expressed with only a few bits of mantissa. for example, in a representation with 4 bits of mantissa and a 5-bit exponent, values can be expressed in a range $[2^{-14}0.001_2, 2^{15}1.111_2]$, or approximately $[2^{-17}, 2^{16}]$. in contrast, a 4-bit fixed point number can only represent values in the range $[0001_2, 1111_2]$, or approximately $[2^0, 2^4]$.

FIG. 5 is a diagram 500 illustrating three alternative block floating-point formats, as can be used in certain examples of the disclosed technology. These formats may be useful for two-dimensional convolutions, but the formats can be generalized to higher-dimensional convolutions as well. As shown, a first format 510 represents an entire convolution filter 512 of values that share a single exponent 514. A different convolution filter 516 of values can share a single exponent 518. Thus, the format 510 illustrates that an entire convolution filter can be a bounding box of the values.

In a second format 520, each spatial pixel can be a bounding box so that a common exponent is shared on a per-spatial-pixel basis, along the channel dimension. As shown, the spatial pixel values 522 share a single exponent 524 and the spatial pixel values 526 share a single exponent 528. For example, for an input with dimensions $[x, y, c_i]$, each spatial dimension x and y can define a bounding box with $c_i$ values. Similarly, for $c_O$ convolution filters of dimension $[f_x, f_y, c_i]$, each pixel $(f_x, f_y)$ for each of the $c_O$ filters can be a separate bounding box with $c_i$ values. The bounding box size for this approach is $c_i$.

In a third format 530, each spatial pixel can be subdivided along the channel dimension so that a bounding box includes a sub-division of a spatial pixel. As shown, the sub-divided spatial pixel values 532 share a single exponent 534 and the sub-divided spatial pixel values 536 share a single exponent 538. For small $c_i$, the cost of handling the scaling factor can be significant. For example, input images at the first layer of deep convolutional neural nets may have $c_i=3$ corresponding to 3 color channels. Tracking a scaling factor for every triplet can be expensive. In this case, the convolution can be re-shaped into a matrix-matrix multiplication to increase the bounding box and decrease the expense of tracking the bounding box. For example, each convolution filter can be flattened to create a matrix W with $c_0$ columns and $f_x$, $*f_y$, $*c_i$ rows. An input matrix X can be created where each row is a $f_x$, $*f_y$, $*c_i$ vector corresponding to a window of the input that the convolution filter sweeps over. The result Y=XW is a matrix that can be re-shaped to match the output of the convolution operation. With the convolution re-formulated as matrix multiplication, the bounding box strategies discussed above in reference to FIG. 4 for matrix multiplication can be applied.

Figure 6:
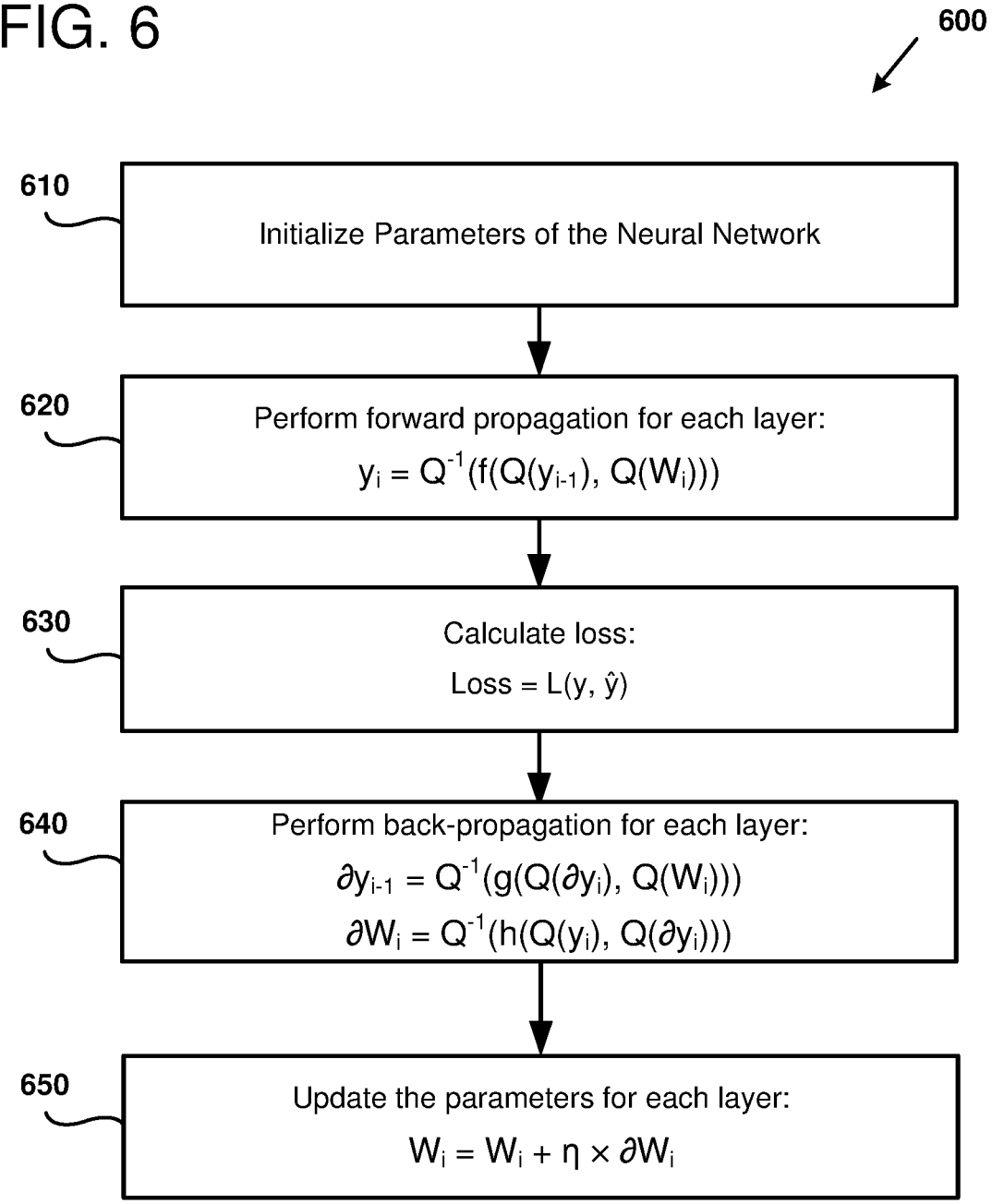
FIG. 6 is a flow diagram depicting a method of training a neural network for use with a quantized model, as can be implemented in certain examples of the disclosed technology.

FIG. 6 is a flow diagram depicting a method 600 of training a neural network using a quantized model, as can be implemented in certain examples of the disclosed technology. For example, training the neural network can include iterating through a set of training data, where the method 600 is used for updating the parameters of the neural network during a given iteration of training data. As one example, the method 600 can be performed by a quantization-enabled system, such as the quantization-enabled system 110 of FIG. 1.

At process block 610, parameters, such as weights and biases, of the neural network can be initialized. As one example, the weights and biases can be initialized to random normal-precision floating-point values. As another example, the weights and biases can be initialized to normal-precision floating-point values that were calculated from an earlier training set. The initial parameters can be stored in a memory or storage of the quantization-enabled system. In one example, the parameters can be stored as quantized floating-point values which can reduce an amount storage used for storing the initial parameters.

At process block 620, input values of the neural network can be forward propagated through the neural network. Input values of a given layer of the neural network can be an output of another layer of the neural network. The values can be passed between the layers from an output of one layer to an input of the next layer using normal-precision floating-point. The output function of the layer i can include a term that is described mathematically as:

$$y_i = Q^{-1}(f(Q(y_{i-1}), Q(W_i)))$$

where $y_{i-1}$ is the output from a layer providing the input to layer i, $W_i$ is the weight tensor for the layer i, $f(\ )$ is a forward function of the layer, $Q(\ )$ is a quantization function, and $Q^{-1}(\ )$ is a de-quantization function. The output function of the layer can be the de-quantized representation of $f(\ )$ or the output function can include additional terms, such as an activation function or the addition of a bias, that are performed using normal-precision floating-point (after de-quantization) or using quantized floating-point (before de-quantization). Generally, the inputs, outputs, and parameters of the layers are tensors. Typically, the inputs, outputs, and parameters of the layers will be vectors or matrices. The quantization function converts normal-precision floating-point values to quantized floating-point values. The quantization function can be selected to account for the type of input data and the types of operations performed by the layer i. For example, when $y_i$ and $W_i$ are two-dimensional matrices and the output function includes a term that takes the cross product of $y_{i-1}$ and $W_i$, the quantization function for $y_{i-1}$ can use a bounding box including a row or a portion of a row of $y_{i-1}$, and the quantization function for $W_i$ can use a bounding box including a column or a portion of a column of $W_i$. The computation can be more efficient when selecting the bounding boxes to follow the flow of the operators, thus making a hardware implementation smaller, faster, and more energy efficient. The de-quantization function converts quantized floating-point values to normal-precision floating-point values.

At process block 630, a loss of the neural network can be calculated. For example, the output y of the neural network can be compared to an expected output ŷ of the neural network. A difference between the output and the expected output can be an input to a cost function that is used to update the parameters of the neural network.

At process block 640, the loss of the neural network can be back-propagated through the neural network. During back propagation, an output error term ∂y and a weight error term ∂W can be calculated. The output error term can be described mathematically as:

$$\partial y_{i-1} = Q^{-1}(g(Q(\partial y_i), Q(W_i)))$$

where $\partial y_{i-1}$ is the output error term from a layer following layer i, $W_i$ is the weight tensor for the layer i, $g(\ )$ is a backward function of the layer, $Q(\ )$ is a quantization function, and $Q^{-1}(\ )$ is a de-quantization function. The backward function $g(\ )$ can be can be the backward function of $f(\ )$ for a gradient with respect to $y_{i-1}$ or a portion of the gradient function. The output error term of the layer can be the de-quantized representation of $g(\ )$ or the output error term can include additional terms that are performed using normal-precision floating-point (after de-quantization) or using quantized floating-point (before de-quantization).

The weight error term ∂W can be described mathematically as:

$$\partial W_i = Q^{-1}(h(Q(y_i), Q(\partial y_i)))$$

where $\partial W_i$ is the weight error term for the layer i, $\partial y_i$ is the output error term for the layer i, $y_i$ is the output for the layer i, $h(\ )$ is a backward function of the layer, $Q(\ )$ is a quantization function, and $Q^{-1}(\ )$ is a de-quantization function. The backward function $h(\ )$ can be can be the backward function of $f(\ )$ for a gradient with respect to $W_{i-1}$ or a portion of the weight error equation. The weight error term of the layer can be the de-quantized representation of $h(\ )$ or the weight error term can include additional terms that are performed using normal-precision floating-point (after de-quantization) or using quantized floating-point (before de-quantization). The weight error term can include additional terms that are performed using normal-precision floating-point.

At process block 650, the parameters for each layer can be updated. For example, the weights for each layer can be updated by calculating new weights based on the iteration of training. As one example, a weight update function can be described mathematically as:

$$W_i = W_i + \eta \times \partial W_i$$

where $\partial W_i$ is the weight error term for the layer i, n is the learning rate for the layer i for the neural network, $W_i$ is the weight tensor for the layer i. In one example, the weight update function can be performed using normal-precision floating-point.

Figure 7:
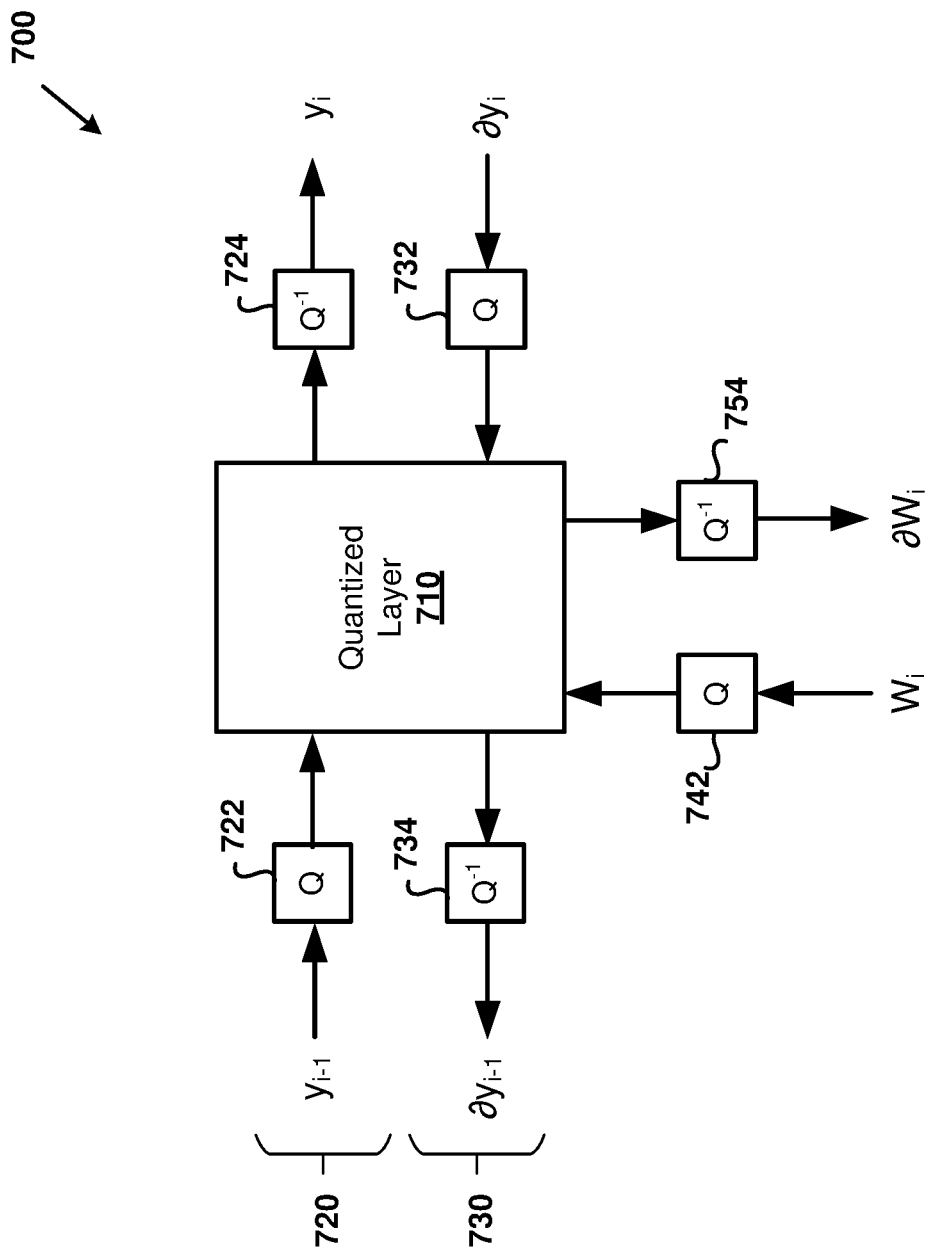
FIG. 7 is a block diagram depicting a mixed-precision floating point environment and a boundary between normal-precision floating-point domain and the quantized floating-point domain, as can be implemented in certain examples of the disclosed technology.

FIG. 7 is a block diagram 700 depicting an example of a mixed-precision floating point environment and a partition between a normal-precision floating-point domain and a quantized floating-point domain. As described above, more computationally expensive operations such as vector-vector, vector-matrix, matrix-matrix, and convolution operations can be performed by the quantized layer 710 in the quantized floating-point domain. Less computationally expensive operations such as scalar add and scalar multiply can be performed outside of the quantized layer 710 in the normal-precision floating-point domain. With regard to neural networks, a neural network can be partitioned into layers (such as layer 710). The bulk of the computational work within a layer can be performed in the quantized floating-point domain and less computationally expensive operations of the layer, such as adding a bias value or calculating an activation function, can be performed in the normal-precision floating-point domain. The values that interface between the layers can be passed from one layer to the other layer in the normal-precision floating-point domain. By quantizing the inputs specifically for a given layer, the quantization can be targeted to the operations of that layer so that the operations of the layer are more efficient. Specifically, bounding boxes of the quantized floating-point format can be selected to reduce the complexity of the computer arithmetic circuits to make the computer logic potentially faster and/or more energy efficient.

As one example, the output values $y_i$, the output error term $\partial y_i$, the weights $W_i$, and the weight error terms $\partial W_i$ for a given layer can be stored in the normal-precision floating-point domain. During the forward propagation flow 720, the output values from an earlier layer can be communicated from the normal-precision floating-point domain to the quantized floating-point domain through the quantizer 722 that converts from normal-precision floating-point to quantized floating-point. The output values from the given layer can be communicated from the quantized floating-point domain to the normal-precision floating-point domain through the de-quantizer 724 that converts from quantized floating-point to normal-precision floating-point. The weights for the given layer can be communicated from the normal-precision floating-point domain to the quantized floating-point domain through the quantizer 742.

During the back-propagation flow 730, the output error term from a later layer can be communicated from the normal-precision floating-point domain to the quantized floating-point domain through the quantizer 732. The output error term from the given layer can be communicated from the quantized floating-point domain to the normal-precision floating-point domain through the de-quantizer 734. The weights for the given layer can be communicated from the normal-precision floating-point domain to the quantized floating-point domain through the quantizer 742. The weight error term error term from the given layer can be communicated from the quantized floating-point domain to the normal-precision floating-point domain through the de-quantizer 754.

Figure 8:
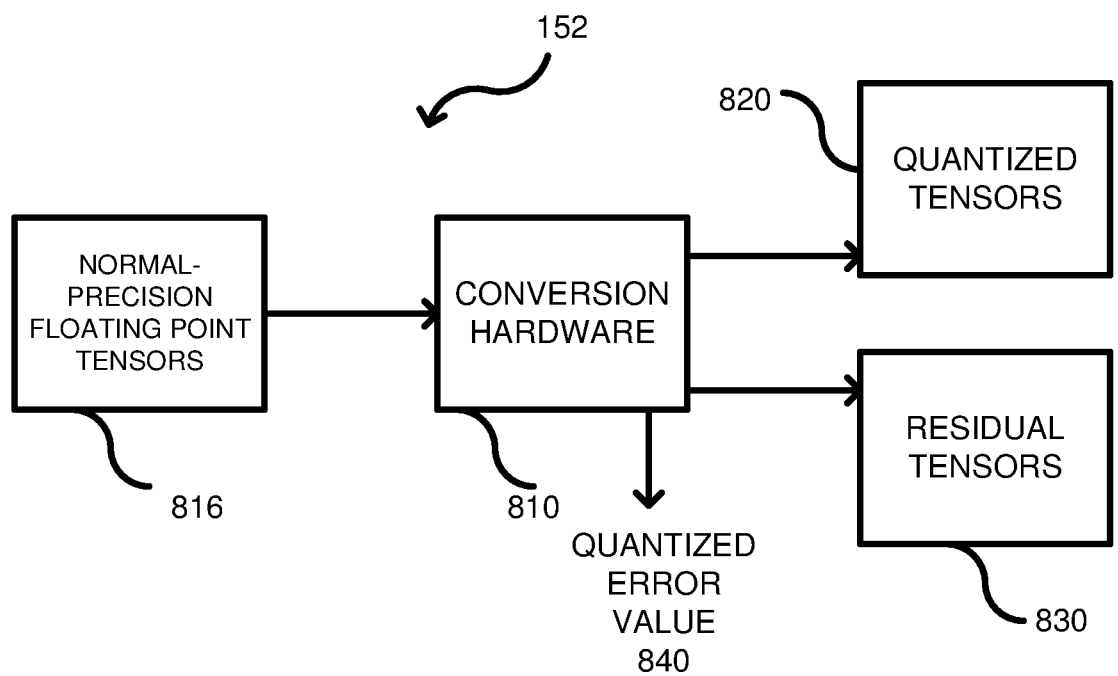
FIG. 8 is a block diagram depicting a conversion, using conversion hardware, from a normal-precision floating point tensor to a quantized tensor and a residual tensor, wherein one or both of the quantized tensor and residual tensor can be used as part of a node output function.

IV. Example Architectures for Choosing Higher or Lower Precision with Quantized and Residual Tensors FIG. 8 shows further details of the normal-precision floating-point to quantized floating-point converter 152 (from FIG. 1). The converter 152 includes conversion hardware 810 that receives normal-precision floating point tensors 816 and converts the tensors to quantized tensors 820 and the residual tensors 830. Generally, the floating-point tensors can include a plurality of vectors having different exponents, but with a common length of mantissa. The conversion hardware 810 performs a shift operation so as to have a common exponent for the plurality of vectors. The conversion hardware 810 can further include decomposition hardware that divides the higher precision floating point tensors into the quantized tensors 820 of lower precision and the residual tensors 830. The conversion hardware 810 can further generate an quantized error value 840 associated with the conversion. For example, conversion from the floating point tensors 816 to the quantized tensors 820 can result in a certain amount of loss due to a reduction of the number of bits. The more information lost due to the bit reduction, the higher the quantized error value. For example, if the bits being lost are all zeros, then the quantized error value is low. However, if the bits being lost include a large and varied range of numbers, then the quantized error can be high.

Figure 9:
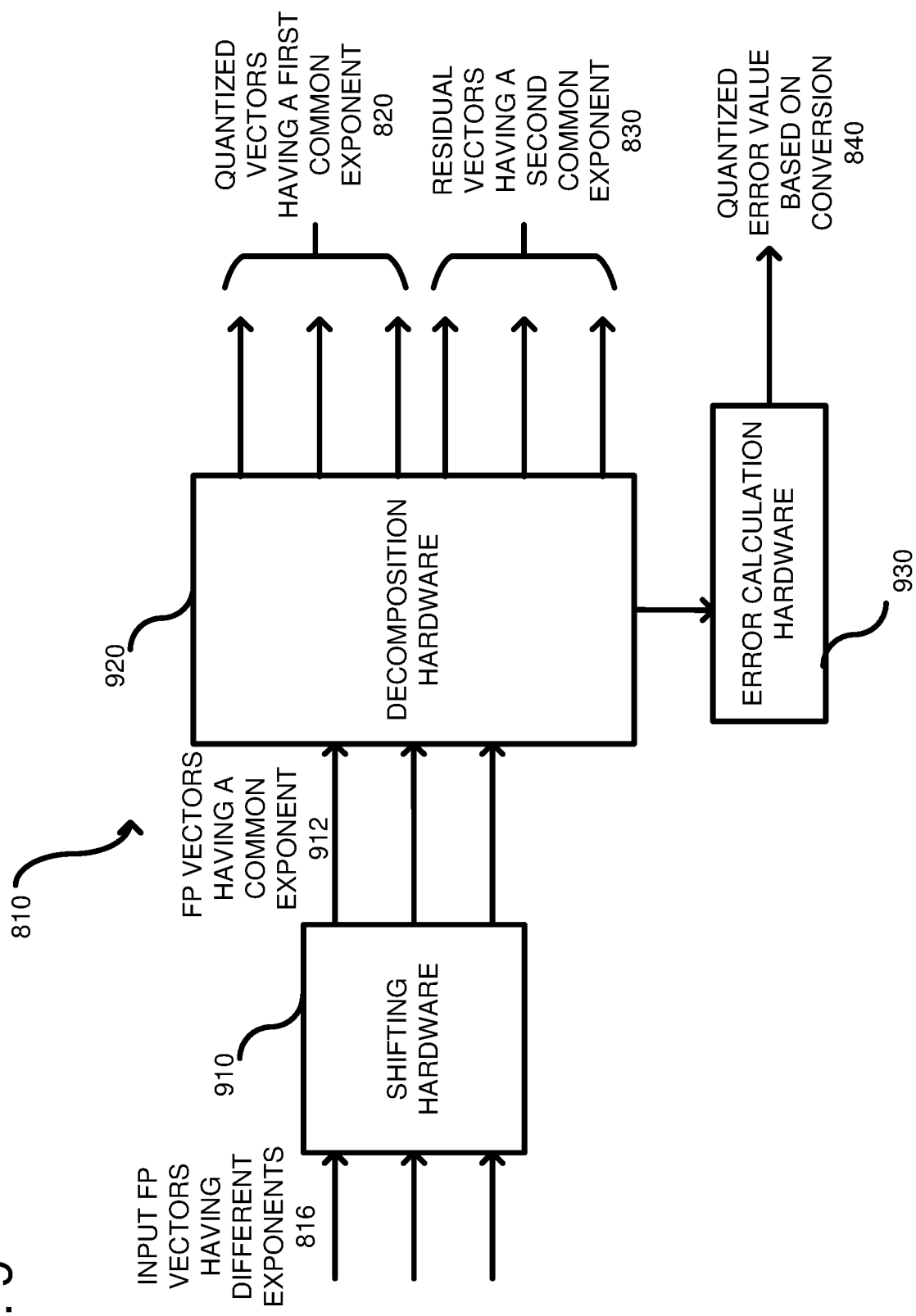
FIG. 9 shows further details of the conversion hardware of FIG. 8.

FIG. 9 shows the conversion hardware 810 in more detail. The conversion hardware 810 includes shifting hardware 910 that can include a shift-right operation that can shift the input floating-point vectors 816 individually any desired number of positions based on a current value of an exponent. For example, the shifting hardware 910 can compare the input exponents and determine which is the largest. Then a shifting can occur based on a difference between the largest exponent and the current exponent being evaluated. Example shifting can be any number of bit positions (1, 2, 3, etc.) so that an output of the shifting hardware 910 includes floating-point vectors having a common exponent 912. The floating-point numbers having the common exponent 912 can then be input into decomposition hardware 920 that divides the floating-point numbers into the quantized vectors 820 and the residual vectors 830. Generally, the quantized vectors 820 and the residual vectors 830 have mantissas of equal lengths, but the exponents are different. More specifically, all of the residual vectors 830 have a common exponent and all of the quantized vectors 820 have a common exponent. However, the common exponent of the quantized vectors 820 can differ from the common exponent of the residual vectors 830. By having mantissas of equal lengths, the quantized vectors 820 and residual vectors 830 can use the same hardware within a node for performing a dot product or other mathematical function on the vectors. The error calculation hardware 930 calculates the quantized error value 840 based on an amount of information contained in the residual vectors 830. Generally, a wider range of bit values results in a greater quantized error. More particularly, the error function performed by the hardware 930 is as follows: $e = x - q(x)$, where x is the input vector and $q(x)$ is the quantized version of x.

Figure 10:
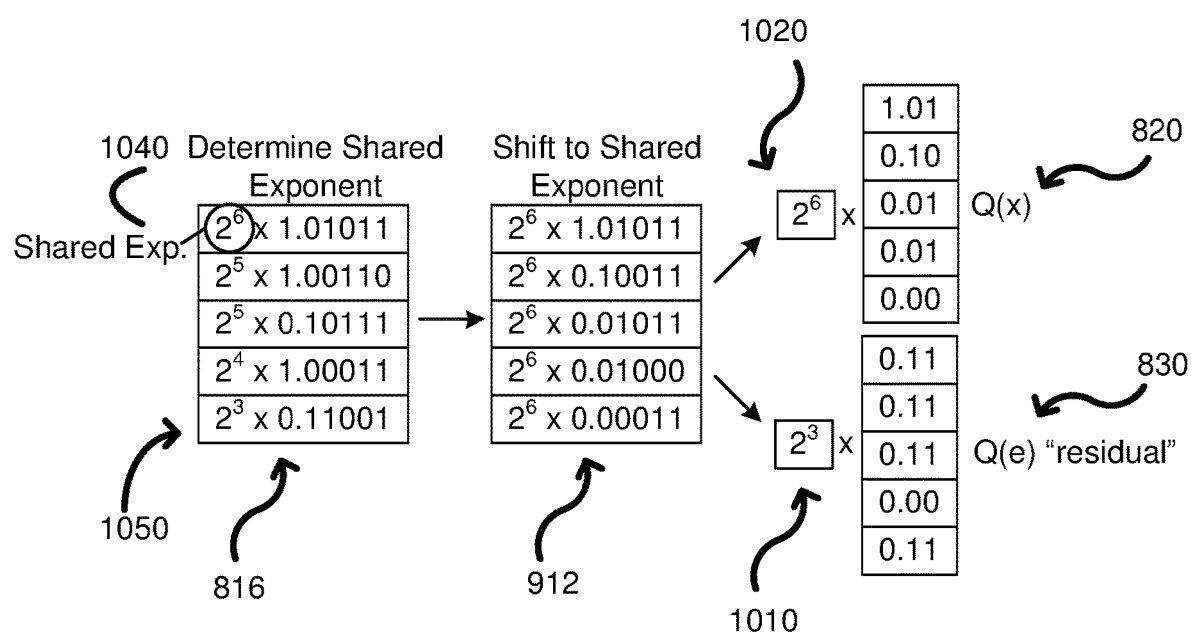
FIG. 10 shows a specific example of floating-point tensors being converted to quantized tensors and residual tensors.

FIG. 10 provides an example showing the floating-point vectors 816 having different exponents. Generally, the floating point numbers have 32 bits, but a smaller number of bits is illustrated for simplicity. The highest-most exponent, $2^6$, is determined to be used as the common exponent so that the shifting hardware 910 can be used to shift the mantissas to the right. In alternative embodiments, the lowest-most exponent can be used with hardware that performs a shift-left operation. As shown, the intermediate output 912 includes the floating-point numbers shifted by the shifting hardware 910 a number of bit positions depending on each vector's exponent, using the following formula: Shift=(max exponent)−(current exponent). For example, the maximum exponent is shown at 1040 and is a value of 6. An exponent of 3 is shown as part of vector 1050. Each vector is shifted independent of the other vectors. The vector at 1050 is shifted according to the formula: the absolute value of the maximum exponent (e.g., 6)—the current exponent (e.g., 3). The decomposition of the shifted vectors includes splitting the bits of the shifted floating point numbers 912 into the quantized portion 820 and the residual portion 830 of equal lengths. As shown at 1010 and 1020, the exponents between the quantized portion 820 and the residual portion 830 can differ. However, all vectors within the quantized portion 820 have the common exponent 1020 and all vectors in the residual portion 830 have a common exponent 1010.

Figure 11:
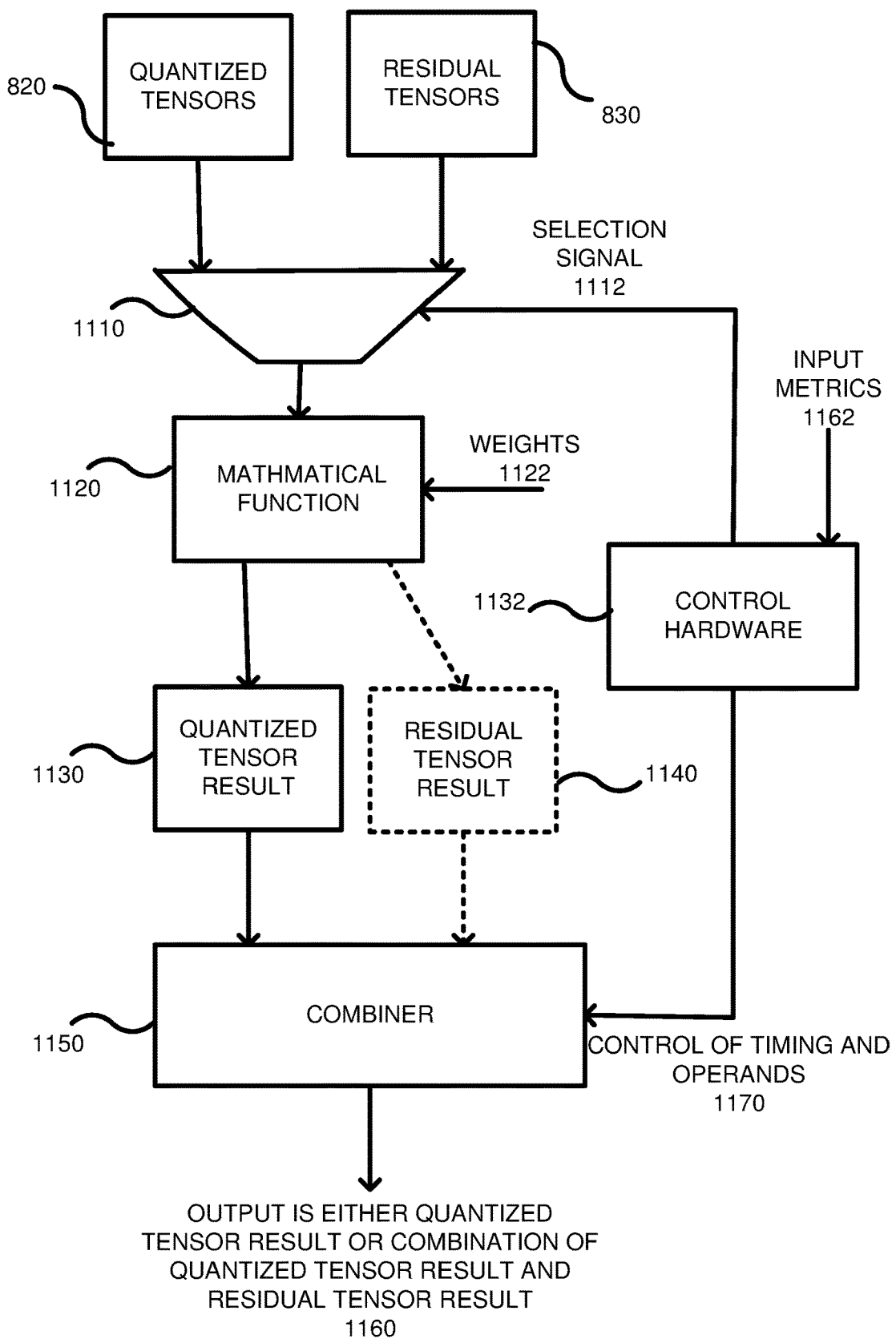
FIG. 11 is a hardware diagram including control hardware for selectively combining the quantized tensors and residual tensors of FIG. 10.

FIG. 11 is a hardware diagram according to one embodiment for selectively determining higher precision or lower precision when performing a mathematical operation in a node. The quantized tensors 820 and the residual tensors 830 are input into a multiplexer 1110. Only one of tensors 820, 830 are passed to a mathematical function 1120 at a time depending on a state of a selection signal 1112. A mathematical function 1120 can be performed using a formula, such as the formula shown below:

$$f(n) = \sum_{i=0 \text{ to } E-1} Q(w_i)Q(x_i)$$

The mathematical function can include a dot product between the quantized tensors and the weights 1122. Although not shown, the weights 1122 can also be quantized weights and have a residual component applied to the mathematical function. The technique can also be applied to vector-matrix and matrix-matrix multiplication. The result of f (n) is shown as the quantized tensor result 1130.

Depending on a control hardware 1132, after f(n) is determined for the quantized tensors 820, the process can be repeated using the same hardware 1120 for the residual tensors 830. The result is shown at 1140, which is the function f(n) for the residual tensors. The residual tensor result 1140 is shown in dashed to indicate that it need not be included. If low precision is desired, then only the quantized tensor result 1130 is used. However, for higher precision, the residual tensor result 1140 can also be included. For lower precision, only the quantized tensor result 1130 is used in a combiner 1150 as an operand. As a result, an output 1160 is f(n) described in the formula above. However, if the residual tensor results 1140 are also used, then the output of the combiner 1150 is represented by the following formula, which is a combination of the results 1130, 1140:

$$f(n) = \sigma\left(Q^{-1}\left(\sum_{i=0 \text{ to } E-1} Q(w_i)Q(x_i) + \sum_{i=0 \text{ to } E-1} Q(w_i)Q(e_i)\right) + b\right)$$

In either case, the output 1160 is an output of the node. When the output is only the quantized tensor result 1130, the output is lower precision, and when the output includes both the quantized tensors and the residual tensors, then the result 1160 is higher precision. Thus, the control hardware 1132 can be viewed as switching between a high-precision mode of operation and a low-precision mode of operation.

The control hardware 1132 makes a determination of whether to be in the low-precision mode or high-precision mode based on input metrics 1162, described further below in relation to FIG. 12. If lower precision is desired, then the mathematical function 1120 is performed only once. However, if higher precision is desired, then the control hardware 1132 passes the quantized tensors 820 and the residual tensors 830 sequentially through the mathematical function using the selection signal 1112. Additionally, the control hardware 1132 can choose which operands to use in the combiner 1150 using a control signal 1170. In this way, the same hardware 1120 can be used for both the quantized tensors 820 and the residual tensors 830. One advantage of using the same hardware 1120 is that the neural network can include lower precision hardware, which is faster and smaller to produce higher precision results. Additionally, the lower precision mode is used a majority of the time and, therefore, the circuit is faster overall. Both the quantized tensors 820 and the residual tensors 830 are sized to match the lower-precision hardware 1120. However, because the quantized tensors 820 are processed first, followed by the residual tensors 830, a high-precision result can selectively be achieved using the low-precision hardware. More particularly, the higher precision is double the bit length than the lower precision. In alternative embodiments, parallel hardware can be used to perform the mathematical function 1120 separately on the quantized tensors 820 and the residual tensors 830.

It should also be realized that although only a single residual tensor is described, additional residual tensors can be added. In such a case, the output of the combiner 1150 can be as follows:

$$f(n) = \sigma\left(Q^{-1}\left(\sum_{i=0 \text{ to } E-1} Q(w_i)Q(x_i) + \sum_{i=0 \text{ to } E-1} Q(w_i)Q(e0_i) + \sum_{i=0 \text{ to } E-1} Q(w_i)Q(e1_i) + \ldots\right) + b\right)$$

And the same mathematical function hardware 1120 can be used for each error term.

Figure 12:
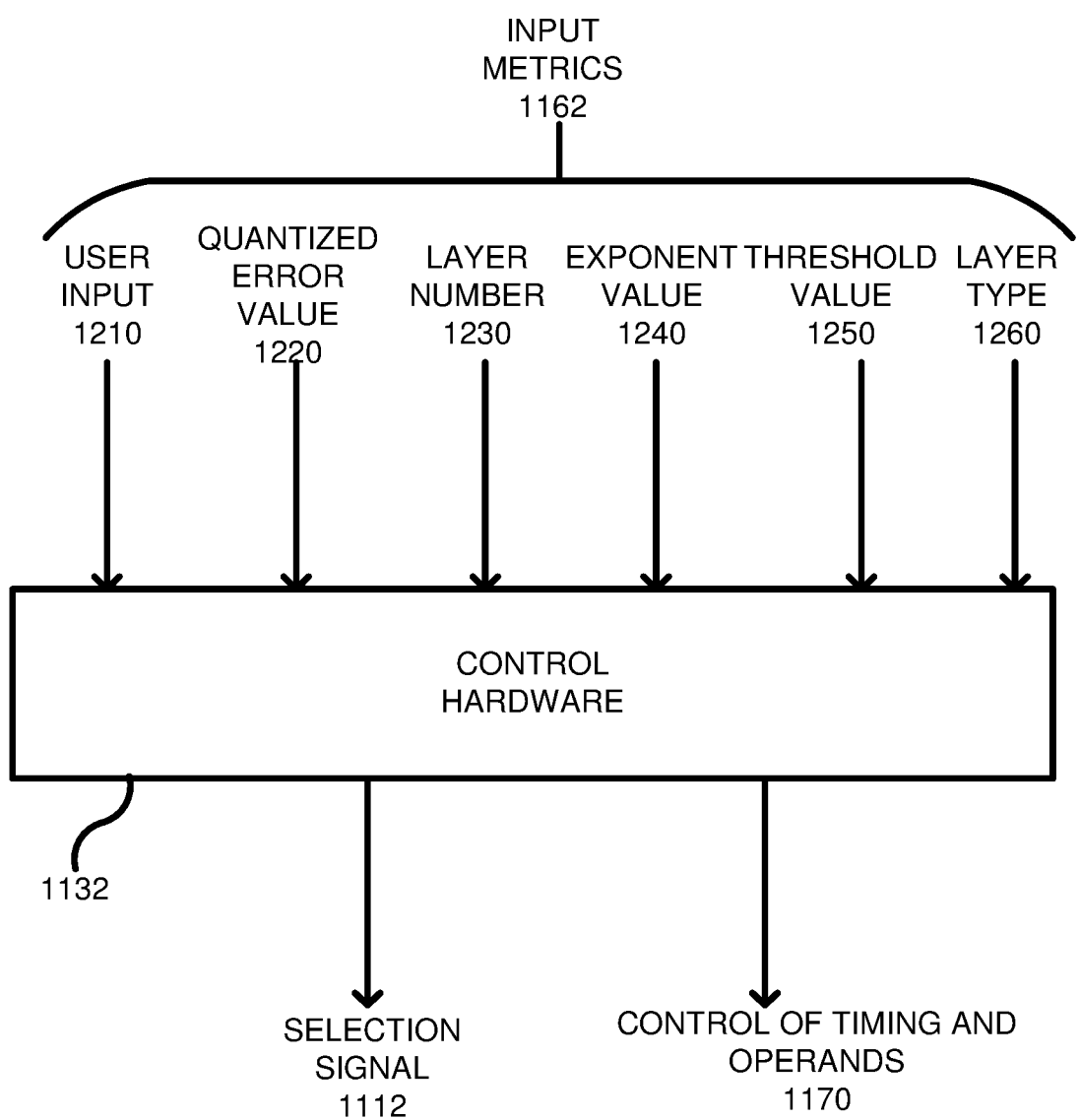
FIG. 12 shows exemplary input metrics used by the control hardware of FIG. 11.

FIG. 12 shows the control hardware 1132 and the input metrics 1162 in more detail. Which of the input metrics 1162 are used depends on the particular implementation. The input metrics 1162 are used by the control hardware 1132 to make decisions whether to use the residual tensor result 1140 to obtain higher precision. At 1210, user input can be provided, wherein a user can control which nodes should receive higher precision. For example, the user can communicate using an Application Programming Interface (API) wherein the user can indicate when and where higher precision is desired. For purposes of simplicity, network service requests are generally described as API requests, but it is understood that other network service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a network service receives the API request from a client device or from the host computer, the network service can generate a response to the request and send the response to the endpoint identified in the request. The API can be made to the NN accelerator 180 of FIG. 1. The user can control individual nodes, such as nodes 225, 226, or the user can control groups of nodes, such as at the layer level (e.g., layer 220).

At 1220, a quantized error value can be used. For example, returning to FIG. 9, an output 840 of the error calculation hardware 930 can be used. If the quantized error value 840 exceeds a threshold value (input at 1250), then higher precision is automatically used. Thus, if the quantized error value 840 is too high, then it's an indicator that the quantized vectors 820 are too imprecise. Accordingly, the residual vectors 830 can be added to the result in combiner 1150 (FIG. 11) to obtain a more accurate result. At 1230, a layer number can be used. For example, looking at the neural network 200 (FIG. 2), the layer number can be associated with an input layer, such as layer 210, an output layer, such as layer 240, or a number associated with an intermediate layer, such as layers 220 or 230. Still further, at 1240, an exponent value 1240 can be used. For example, returning to FIG. 10, an exponent value of "6", shown at 1040, was used as the exponent value associated with the quantized vectors 820. Different values of exponents can be known to have lower precision. Consequently, a threshold can be set and if the exponent exceeds the threshold then the control hardware can switch to the higher precision mode of operation. In some implementations, such as back propagation, the threshold can be changed dynamically. Finally, a layer type 1260 can be used. For example, the user can enter a type of layer that performs higher precision, such as an input layer, output layer, a convolution layer or a fully connected layer. Alternatively, the layer types can be pre-programmed into the neural network. Any combination of these input metrics can be used to generate the selection signal 1112 and the control signal 1170.

Figure 13:
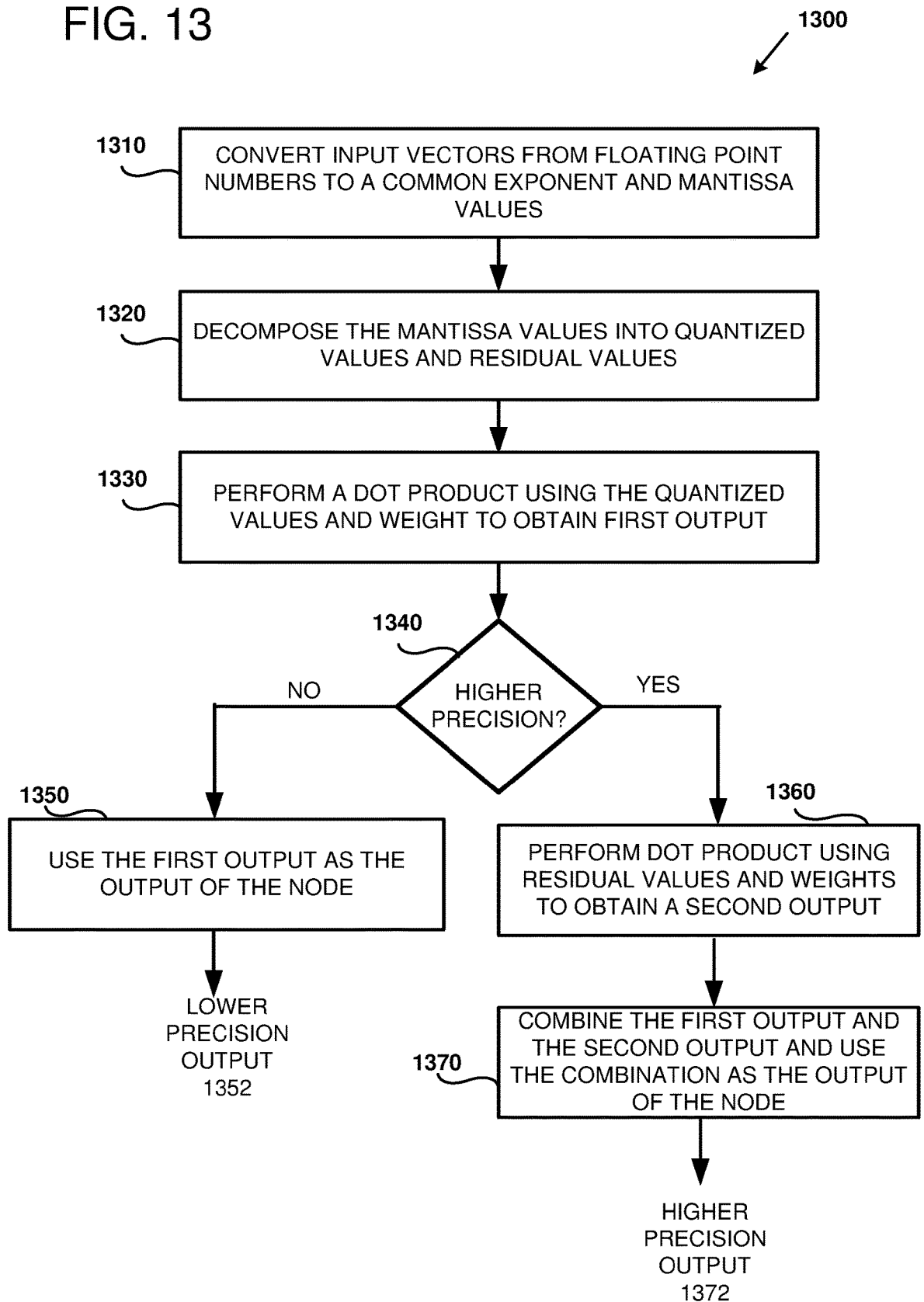
FIG. 13 is a flow diagram depicting a method of operating a neural network accelerator using selective precision of quantized tensors.

FIG. 13 is a flowchart 1300 according to one embodiment for switching between higher-precision and lower-precision modes of operation. In process block 1310, input vectors are converted from floating-point numbers to a common exponent and mantissa values prior to be quantized. For example, in FIG. 10, the floating-point vectors 816 can be converted through shifting operations to the common exponent and mantissas shown at 912. Such shifting can occur by shifting hardware 910 (FIG. 9). Conversion hardware 810 can be used to convert the floating point tensors 816 to quantized tensors 820 that have a common exponent and mantissas, as shown in FIG. 10 with 1020 being the common exponent for mantissas associate with the quantization vectors 820. In process block 1320, the mantissa values associated with the floating point numbers can be decomposed into quantized values and residual values. For example, in FIG. 9, the decomposition hardware 920 can generate the quantized vectors 820 and the residual vectors 830, such as by dividing the floating point numbers. Additionally, in FIG. 10, the lower 3 bits are used as the residual vectors 830 and the upper 3 bits are used as the quantized vectors 820. Thus, using one portion of the floating point mantissa as the quantized vectors and another portion for the residual vectors by dividing the floating point mantissa into different portions is one technique for decomposing the mantissa values. In one particular example, the mantissas can be divided in half to produce the quantized vectors 820 and the residual vectors 830. Other techniques can be used. In process block 1330, a dot product is performed using the quantized vectors and weights to obtain a first output. Although a dot product upon vectors is described herein, it should be appreciated that the techniques can be used for vector-matrix or matrix-matrix multiplication. In decision block 1340, a decision is made whether higher precision is needed. Such a decision can be made by the control hardware 1132 (FIG. 12) based on the input metrics 1162. If higher precision is not needed, then at 1350, the first output from process block 1330 is used as the node output, which is a lower precision output, as shown at 1352. On the other hand, if a high precision output is needed, then at process block 1360, a dot product is performed using residual values and weights to obtain a second output. For example, the control hardware 1132 can control the selection signal 1112 of multiplexer 1110 to allow the residual tensors 830 to pass through the mathematical function 1120 (which can perform a dot product using the functions described above). In process block 1370, the first output and the second output can be combined to obtain a higher precision output 1372 as an output of the node. For example, the combiner 1150 can be used to combine the results 1130 and 1140, such as through concatenation, addition, etc.

V. Example Computing Environment

Figure 14:
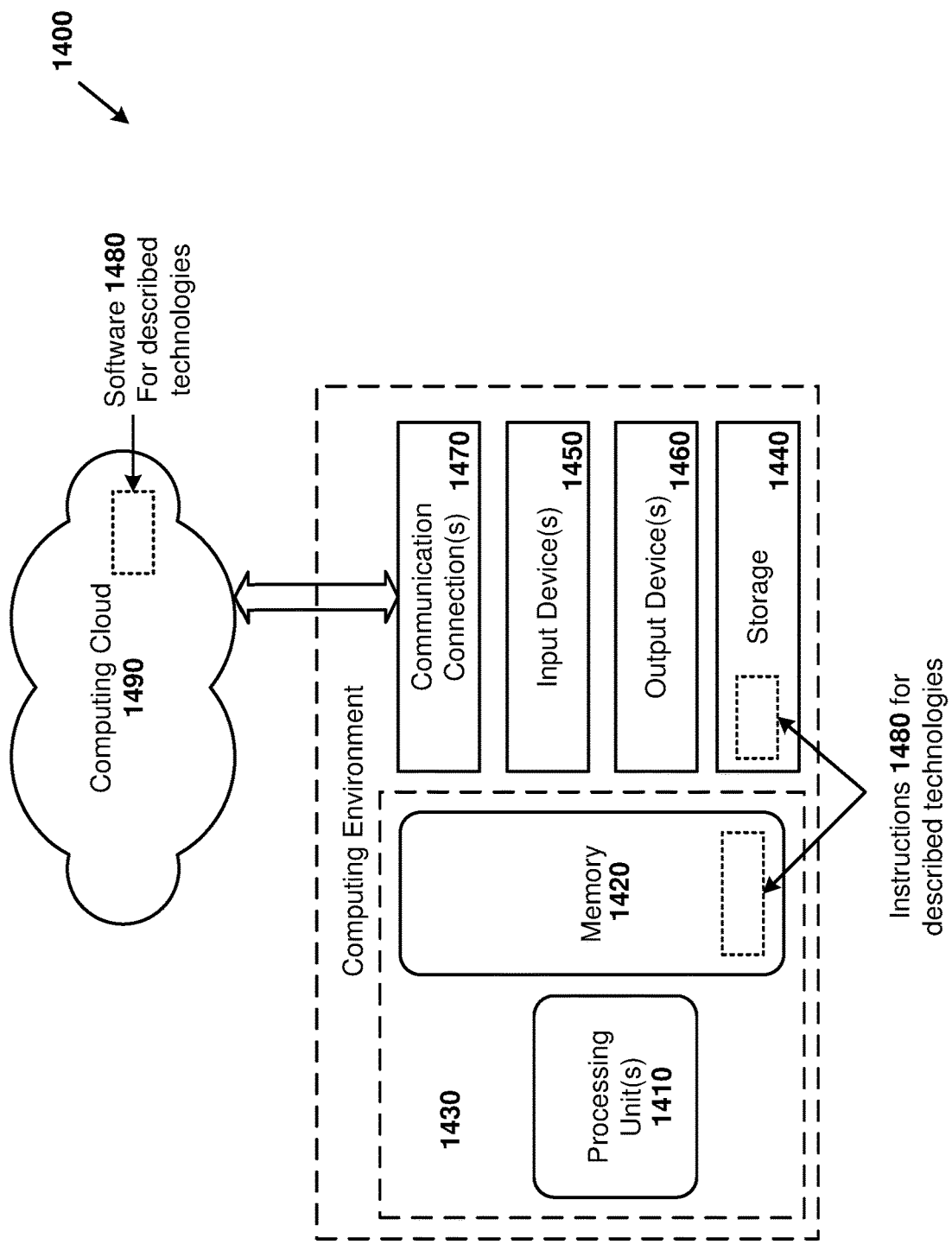
FIG. 14 is a block diagram illustrating a suitable computing environment for implementing some embodiments of the disclosed technology.

FIG. 14 illustrates a generalized example of a suitable computing environment 1400 in which described embodiments, techniques, and technologies, including supporting a multi-language playback framework, can be implemented.

The computing environment 1400 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 14, the computing environment 1400 includes at least one processing unit 1410 and memory 1420. In FIG. 14, this most basic configuration 1430 is included within a dashed line. The processing unit 1410 executes computer-executable instructions and may be a real or a virtual processor. In a multi-processing system, multiple processing units execute computer-executable instructions to increase processing power and as such, multiple processors can be running simultaneously. The memory 1420 may be volatile memory (e.g., registers, cache, RAM), non-volatile memory (e.g., ROM, EEPROM, flash memory, etc.), or some combination of the two. The memory 1420 stores software 1480, images, and video that can, for example, implement the technologies described herein. A computing environment may have additional features. For example, the computing environment 1400 includes storage 1440, one or more input devices 1450, one or more output devices 1460, and one or more communication connections 1470. An interconnection mechanism (not shown) such as a bus, a controller, or a network, interconnects the components of the computing environment 1400. Typically, operating system software (not shown) provides an operating environment for other software executing in the computing environment 1400, and coordinates activities of the components of the computing environment 1400.

The storage 1440 may be removable or non-removable, and includes magnetic disks, magnetic tapes or cassettes, CD-ROMs, CD-RWs, DVDs, or any other medium which can be used to store information and that can be accessed within the computing environment 1400. The storage 1440 stores instructions for the software 1480, plugin data, and messages, which can be used to implement technologies described herein.

The input device(s) 1450 may be a touch input device, such as a keyboard, keypad, mouse, touch screen display, pen, or trackball, a voice input device, a scanning device, or another device, that provides input to the computing environment 1400. For audio, the input device(s) 1450 may be a sound card or similar device that accepts audio input in analog or digital form, or a CD-ROM reader that provides audio samples to the computing environment 1400. The output device(s) 1460 may be a display, printer, speaker, CD-writer, or another device that provides output from the computing environment 1400.

The communication connection(s) 1470 enable communication over a communication medium (e.g., a connecting network) to another computing entity. The communication medium conveys information such as computer-executable instructions, compressed graphics information, video, or other data in a modulated data signal. The communication connection(s) 1470 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed agents, bridges, and agent data consumers. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1490. For example, the disclosed methods can be executed on processing units 1410 located in the computing environment 1430, or the disclosed methods can be executed on servers located in the computing cloud 1490.

Computer-readable media are any available media that can be accessed within a computing environment 1400. By way of example, and not limitation, with the computing environment 1400, computer-readable media include memory 1420 and/or storage 1440. As should be readily understood, the term computer-readable storage media includes the media for data storage such as memory 1420 and storage 1440, and not transmission media such as modulated data signals.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

What is claimed is:

1. A method, comprising:
   in a neural network;
   inputting a quantized tensor value and a residual tensor value into hardware used to perform a mathematical operation;
   performing a first product using the hardware, wherein the product includes the quantized tensor value and weights to provide a first output;
   using control hardware to selectively choose whether to perform a high-level of precision and if a high-level of precision is selected, performing a second product using the residual tensor value and weights to obtain a second output, wherein the first product and the second product occur sequentially using the hardware; and
   combining the first output and the second output to generate a node output;
   wherein the first output is calculated using the hardware, which is designed to perform vector multiplication and the second output is generated sequentially after the first output using the same hardware to generate a high-precision node output using lower precision hardware, whereby the lower precision hardware, which is faster than high-precision hardware, is used to generate a high-precision result.

2. The method of claim 1, further including converting input vectors from floating-point numbers to a common exponent and mantissa value and decomposing the mantissa value into the quantized tensor value and the residual tensor value.

3. The method of claim 2, wherein the selectively choosing is based on a quantized error value calculated from the converting each of the input vectors from its respective floating-point number to the common exponent and the mantissa value.

4. The method of claim 3, further including performing the product on the residual value based on whether the quantized error value exceeds a threshold.

5. The method of claim 4, wherein the threshold changes based on a value of the common exponent.

6. The method of claim 1, wherein the neural network includes multiple layers of nodes, the method is performed on each node, and the selectively choosing is based upon which of the multiple layers the node resides.

7. The method of claim 1, wherein the neural network includes multiple layers of nodes and the selectively choosing is based a layer type.

8. The method of claim 1, wherein the selectively choosing is based on an absolute value of a common exponent.

9. A method, comprising:
   receiving quantized tensors and residual tensors at inputs to a multiplexer;
   receiving a selection signal from control hardware coupled to the multiplexer, the selection signal controlling that the quantized tensors pass through the multiplexer;
   using hardware, performing a first mathematical operation between weights and the quantized tensors to generate a quantized tensor result;
   inputting the quantized tensor result into a combiner;
   changing the selection signal from the control hardware to pass the residual tensors through the multiplexer;
   using the hardware, performing a second mathematical operation between the weights and the residual tensors to generate a residual tensor result;
   inputting the residual tensor result into the combiner; and
   combining the quantized tensor result and the residual tensor result using the combiner to produce a node output, whereby the hardware is a lower precision hardware and whereby using the lower precision hardware to perform the first and second mathematical operations and then combining results thereof allows the lower precision hardware to provide a higher precision result.

10. The method of claim 9, wherein the hardware is low-precision hardware, but the node output is high-precision due to the first and second mathematical operations being performed sequentially.

11. The method of claim 9, wherein the first and second mathematical operations are dot products.

12. The method of claim 9, wherein the control hardware controls whether a high-precision mode or low-precision mode of operation is used.

13. The method of claim 12, wherein user input is read by the control hardware to determine whether to perform the high-precision mode or low-precision mode.

14. The method of claim 9, wherein the first and second mathematical operations include one of the following: vector-matrix multiplication or matrix-matrix multiplication.

15. A system, comprising:
- a first memory register for storing a quantized tensor;
- a second memory register for storing a residual tensor;
- a multiplexer having first and second inputs coupled to the first and second memory registers, respectively;
- control hardware coupled to a select line of the multiplexer;
- hardware for performing a mathematical function, the hardware having a first input coupled to an output of the multiplexer and a second input coupled to receive weights;
- a combiner coupled to the hardware, wherein the combiner is also coupled to the control hardware; and
- wherein the control hardware is configured to allow sequential mathematical operations to be performed using the hardware and results of the sequential mathematical operations to be combined in the combiner in response to the control hardware, whereby the hardware is configured to perform a first product that includes the quantized tensor and weights to provide a first output and configured to perform a second product using the residual tensor and weights to obtain a second output, whereby the second output is configured to be generated sequentially after the first output using the same hardware to generate a high-precision node output using lower precision hardware.

16. The system of claim 15, wherein the control hardware is configured to control the select line depending on whether the system is in a high-precision mode or a low-precision mode.

17. The system of claim 15, wherein the quantized and residual values are calculated by converting input vectors from floating-point numbers to a common exponent and mantissa values and decomposing the mantissa values into the quantized value and the residual value.

18. The system of claim 15, wherein the hardware is designed for low-precision operations but the combiner is designed for high-precision operations.

19. The system of claim 14, wherein the hardware for performing a mathematical function is configured to perform a dot product, vector-matrix multiplication or matrix-matrix multiplication.

* * * * *